US011273970B2

(12) United States Patent
Willis et al.

(10) Patent No.: US 11,273,970 B2
(45) Date of Patent: Mar. 15, 2022

(54) MULTI-COMPARTMENT BEVERAGE BOTTLE SYSTEM AND METHOD

(71) Applicant: In Spirit Group, Inc., Los Angeles, CA (US)

(72) Inventors: Clifton Willis, Evansville, IN (US); Brandon Schwartz, Los Angeles, CA (US); Lawrence Cisneros, Los Angeles, CA (US); Feyats Lo, Dongguan (CN)

(73) Assignee: In Spirit Group, Inc., Los Angleles, CA (US)

( * ) Notice: Subject to any disclaimer, the term of this patent is extended or adjusted under 35 U.S.C. 154(b) by 0 days.

(21) Appl. No.: 17/390,865

(22) Filed: Jul. 30, 2021

(65) Prior Publication Data

US 2021/0354900 A1 Nov. 18, 2021

Related U.S. Application Data

(62) Division of application No. 16/611,855, filed as application No. PCT/US2019/035086 on May 31, 2019, now Pat. No. 11,155,397.

(Continued)

(51) Int. Cl.
*B65B 29/10* (2006.01)
*B65B 7/16* (2006.01)
(Continued)

(52) U.S. Cl.
CPC .......... *B65D 81/3211* (2013.01); *A23L 2/52* (2013.01); *B29C 45/1676* (2013.01); *B65B 3/04* (2013.01);
(Continued)

(58) Field of Classification Search
CPC .......... B65B 3/027; B65B 3/04; B65B 7/168; B65B 7/28; B65B 7/2835; B65B 7/2842;
(Continued)

(56) References Cited

U.S. PATENT DOCUMENTS 3,255,926 A 6/1966 Modderno
3,326,400 A 6/1967 Hamelin et al.
(Continued)

FOREIGN PATENT DOCUMENTS

DE 112013003660 T5 4/2015
JP 2001097386 A * 4/2001 ......... B65D 81/3211
(Continued)

OTHER PUBLICATIONS

Slides 1-11 of In Spirit Group investor presentation, disclosed on Oct. 6, 2016, illustrating an early prototype bottle.

*Primary Examiner* — Stephen F. Gerrity
(74) *Attorney, Agent, or Firm* — Lance M. Pritikin

(57) ABSTRACT

Embodiments of a multi-compartment beverage bottle system and methods of manufacturing the system are disclosed. First and second housing elements are in mutual engagement with one another to at least partially define a fluid vessel with a fluid cavity therein. The fluid cavity includes a first fluid compartment and a second fluid compartment. The first housing element is rotatable between a storage position and a mix position with respect to the second housing element. A shuttle element is disposed within the fluid cavity and axially actuatable along the main axis into and out of a seal position. Rotation of the first housing element toward the storage position actuates the shuttle element toward the seal position. Rotation of the first housing element toward the mix position actuates the shuttle element away from the seal (Continued)

position, thereby placing the first and second fluid compartments into fluid communication with one another for mixing.

7 Claims, 28 Drawing Sheets

Related U.S. Application Data

(60) Provisional application No. 62/770,657, filed on Nov. 21, 2018, provisional application No. 62/679,578, filed on Jun. 1, 2018.

(51) Int. Cl.
| | |
|---|---|
| *B65B 3/04* | (2006.01) |
| *B65B 7/28* | (2006.01) |
| *B65D 81/32* | (2006.01) |
| *A23L 2/52* | (2006.01) |
| *B29C 45/16* | (2006.01) |
| *B65D 1/04* | (2006.01) |
| *B65D 25/06* | (2006.01) |
| *B65D 25/08* | (2006.01) |
| *B65D 51/18* | (2006.01) |
| *B65D 53/02* | (2006.01) |
| *B65D 83/00* | (2006.01) |
| *C12G 3/06* | (2006.01) |
| *B29K 21/00* | (2006.01) |
| *B29K 23/00* | (2006.01) |
| *B29L 31/00* | (2006.01) |

(52) U.S. Cl.
CPC ............... *B65B 7/168* (2013.01); *B65B 7/28* (2013.01); *B65B 29/10* (2013.01); *B65D 1/04* (2013.01); *B65D 25/06* (2013.01); *B65D 25/08* (2013.01); *B65D 51/18* (2013.01); *B65D 53/02* (2013.01); *B65D 83/0027* (2013.01); *C12G 3/06* (2013.01); *A23V 2002/00* (2013.01); *B29K 2021/003* (2013.01); *B29K 2023/12* (2013.01); *B29L 2031/7158* (2013.01); *B65B 2230/02* (2013.01); *B65D 2251/0015* (2013.01); *B65D 2251/0078* (2013.01)

(58) Field of Classification Search
CPC ... B65B 29/10; B65B 2230/02; B65D 47/242; B65D 51/18; B65D 81/3211; B65D 2251/0015; B65D 2251/0078
See application file for complete search history.

(56) References Cited

U.S. PATENT DOCUMENTS

| | | |
|---|---|---|
| 3,443,726 A | 5/1969 | Muller et al. |
| 3,741,383 A | 6/1973 | Wittwer |
| 3,768,697 A | 10/1973 | Lerner |
| 3,802,604 A | 4/1974 | Morane et al. |
| 3,856,138 A | 12/1974 | Maekawa et al. |
| 3,924,741 A | 12/1975 | Kachur et al. |
| 3,960,298 A | 6/1976 | Birrell |
| 3,964,643 A | 6/1976 | Morane et al. |
| 4,122,943 A | 10/1978 | Silver et al. |
| 4,132,308 A | 1/1979 | Goncalves |
| 4,195,730 A | 4/1980 | Hunt |
| 4,693,366 A | 9/1987 | Goncalves |
| 4,727,985 A | 3/1988 | McNeirney et al. |
| 4,757,916 A | 7/1988 | Goncalves |
| 4,779,722 A | 10/1988 | Hall |
| 4,856,995 A | 8/1989 | Wagner |
| 4,936,446 A | 6/1990 | Lataix |
| 4,950,237 A | 8/1990 | Henault et al. |
| 4,964,539 A | 10/1990 | Mueller |
| 4,979,629 A | 12/1990 | Askerneese |
| 5,088,627 A | 2/1992 | Musel |
| 5,127,548 A | 7/1992 | Brunet et al. |
| 5,246,142 A | 9/1993 | DiPalma et al. |
| 5,249,712 A | 10/1993 | Lontrade et al. |
| 5,398,827 A | 3/1995 | Armstrong et al. |
| 5,398,828 A | 3/1995 | Valyi |
| 5,421,483 A | 6/1995 | Parise |
| 5,433,328 A | 7/1995 | Baron et al. |
| 5,437,381 A | 8/1995 | Herrmann |
| 5,447,226 A | 9/1995 | Laine |
| 5,564,600 A | 10/1996 | Renault |
| 5,588,550 A | 12/1996 | Meyer |
| 5,593,052 A | 1/1997 | McGee |
| 5,607,072 A | 3/1997 | Rigney et al. |
| 5,613,623 A | 3/1997 | Hildebrandt |
| 5,638,968 A | 6/1997 | Baron et al. |
| 5,647,481 A | 7/1997 | Hundertmark et al. |
| 5,772,017 A | 6/1998 | Kang |
| 5,921,440 A | 7/1999 | Maines |
| 5,934,515 A | 8/1999 | Bennett |
| 5,992,693 A * | 11/1999 | Albisetti ............ B65D 81/3211 206/221 |
| 6,045,254 A | 4/2000 | Inbar et al. |
| 6,135,275 A | 10/2000 | Kelders et al. |
| 6,148,996 A | 11/2000 | Morini |
| 6,244,433 B1 | 6/2001 | Vieu |
| 6,247,586 B1 | 6/2001 | Herzog et al. |
| 6,269,979 B1 | 8/2001 | Dumont |
| 6,321,908 B1 * | 11/2001 | Lorscheidt ......... B65D 81/3211 206/221 |
| 6,481,571 B1 | 11/2002 | Kelders et al. |
| 6,513,650 B2 | 2/2003 | Mollstam et al. |
| 6,571,977 B2 | 6/2003 | Goncalez et al. |
| 6,575,208 B2 * | 6/2003 | Sharon et al. .......... B65B 29/10 141/103 |
| 6,705,490 B1 | 3/2004 | Lizerbram et al. |
| 6,705,491 B1 | 3/2004 | Lizerbram et al. |
| 6,910,573 B2 | 6/2005 | Deans |
| 6,959,807 B2 | 11/2005 | Sharon et al. |
| 7,036,975 B2 | 5/2006 | Renz |
| 7,210,575 B2 | 5/2007 | Oswald |
| 7,331,478 B2 | 2/2008 | Aljadi |
| 7,484,633 B1 | 2/2009 | Moher |
| 7,523,822 B2 | 4/2009 | Sharon |
| 7,810,661 B2 | 10/2010 | Murphy |
| 7,850,027 B2 | 12/2010 | Hayes et al. |
| 7,861,854 B2 | 1/2011 | Sharon et al. |
| 8,136,660 B2 | 3/2012 | Sharon |
| 8,146,758 B1 | 4/2012 | Peres |
| 8,151,985 B2 * | 4/2012 | Owoc ................ B65D 81/3211 206/219 |
| 8,459,450 B1 | 6/2013 | Whitaker et al. |
| 8,550,303 B2 | 10/2013 | Greer et al. |
| 8,684,173 B2 | 4/2014 | Otsuka et al. |
| 8,701,906 B1 | 4/2014 | Anderson |
| 8,863,948 B2 | 10/2014 | Ogawa et al. |
| 8,875,926 B2 | 11/2014 | Grajqevci |
| 9,004,301 B2 | 4/2015 | Wahlstrom |
| 9,156,589 B2 | 10/2015 | Fernandez de Castro |
| 9,215,954 B2 | 12/2015 | Bennett |
| 9,381,480 B2 | 7/2016 | Kang |
| 9,629,782 B2 | 4/2017 | Hayes |
| 9,745,115 B2 | 8/2017 | Hall |
| 10,065,785 B2 | 9/2018 | Genchev |
| 10,131,484 B2 | 11/2018 | De Cleir |
| 2002/0185389 A1 | 12/2002 | Kelders et al. |
| 2003/0150748 A1 | 8/2003 | Crawley |
| 2003/0173363 A1 | 9/2003 | Miller, Jr. et al. |
| 2004/0089563 A1 | 5/2004 | Sharon et al. |
| 2004/0168436 A1 | 9/2004 | Zacche' et al. |
| 2006/0021996 A1 | 2/2006 | Scott, III et al. |
| 2006/0049127 A1 * | 3/2006 | Katz et al. ......... B65D 81/3211 215/6 |
| 2006/0254936 A1 | 11/2006 | Corbitt et al. |
| 2007/0017830 A1 | 1/2007 | Neumeyer et al. |

(56) References Cited

U.S. PATENT DOCUMENTS

| | | | |
|---|---|---|---|
| 2007/0193894 A1* | 8/2007 | Macken et al. | B65D 81/3222 |
| | | | 206/219 |
| 2007/0278174 A1 | 12/2007 | Kunz et al. | |
| 2010/0044254 A1 | 2/2010 | Romeo | |
| 2010/0200437 A1 | 8/2010 | Coon | |
| 2010/0213156 A1 | 8/2010 | Belnap | |
| 2011/0011755 A1 | 1/2011 | Cohen | |
| 2011/0233118 A1 | 9/2011 | Nelson | |
| 2012/0248055 A1 | 10/2012 | Kountotsis | |
| 2013/0075287 A1 | 3/2013 | Sharon et al. | |
| 2014/0131229 A1 | 5/2014 | Tippit et al. | |
| 2015/0225130 A1 | 8/2015 | Hall | |
| 2015/0351442 A1 | 12/2015 | Zhu et al. | |
| 2015/0360804 A1 | 12/2015 | Ayeni | |
| 2016/0066749 A1* | 3/2016 | Trager et al. | B65D 81/3211 |
| | | | 206/222 |
| 2018/0044093 A1 | 2/2018 | De Cleir | |

FOREIGN PATENT DOCUMENTS

| | | |
|---|---|---|
| KR | 20170008618 A | 1/2017 |
| WO | 1983001936 A1 | 6/1983 |
| WO | 2011056173 A1 | 5/2011 |
| WO | 2017051178 A1 | 3/2017 |

* cited by examiner

FIG. 8
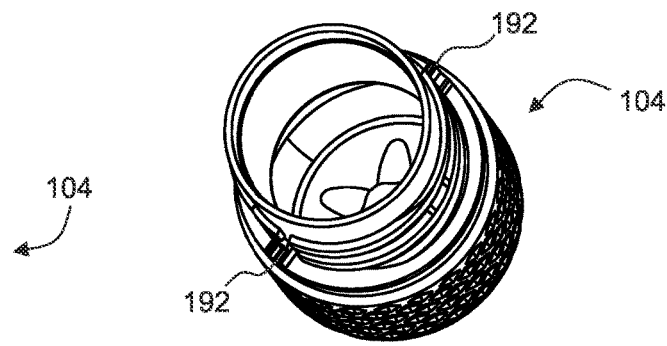
FIG. 9
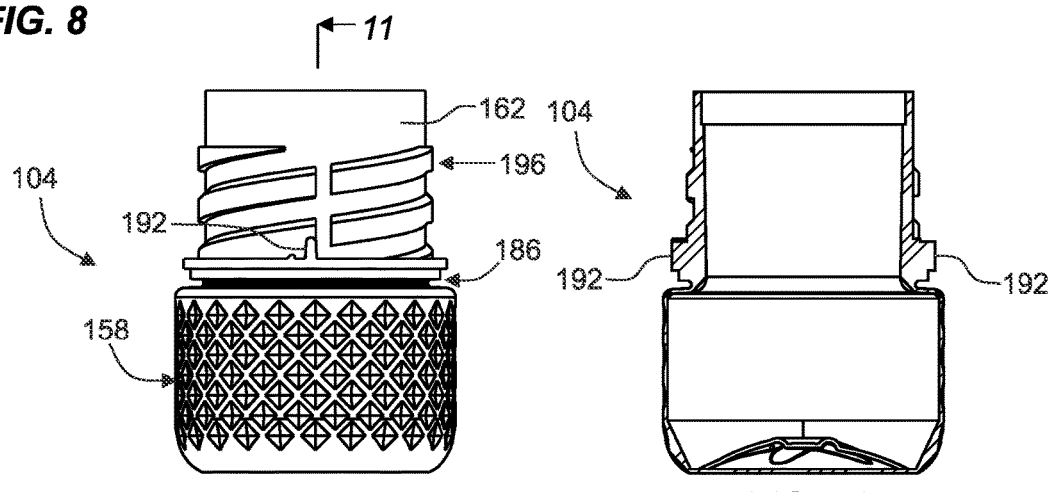
FIG. 10
FIG. 11
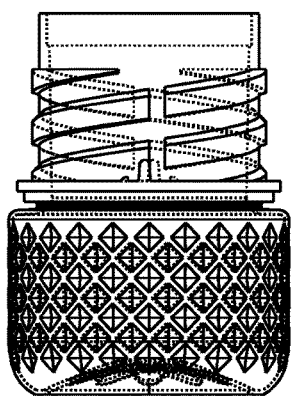
FIG. 12
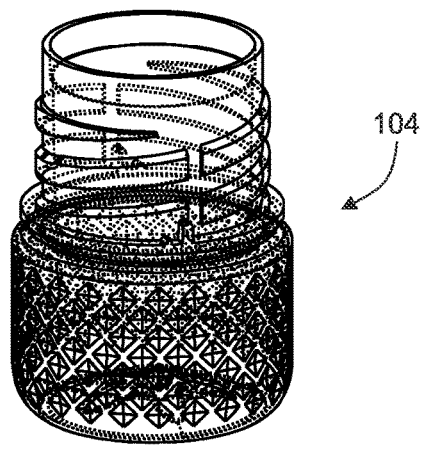
FIG. 13

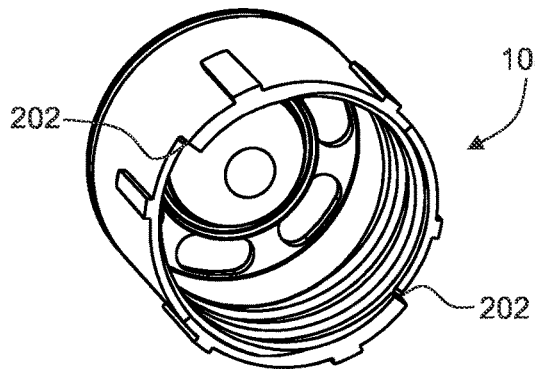
FIG. 18
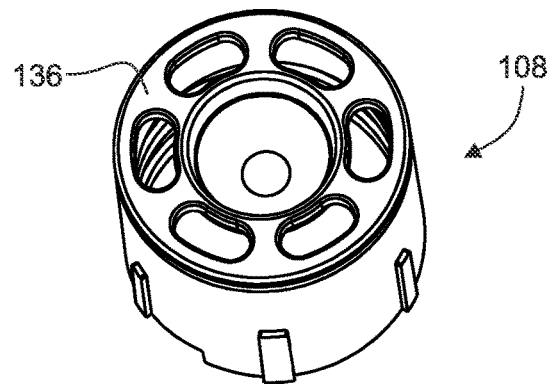
FIG. 19
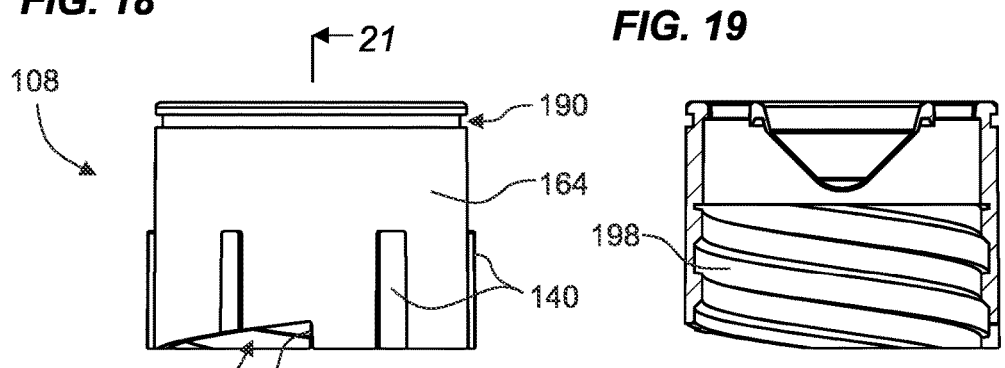
FIG. 20  FIG. 21
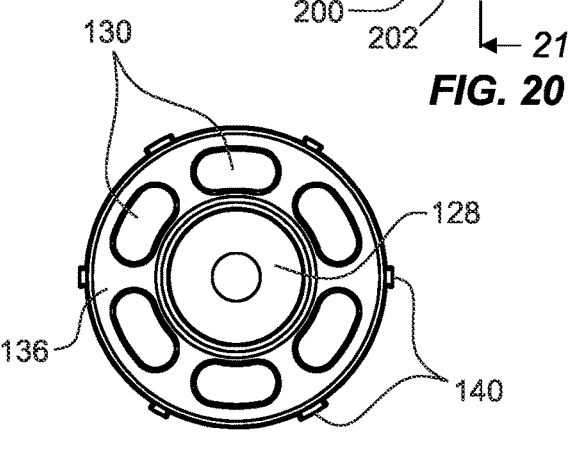
FIG. 22
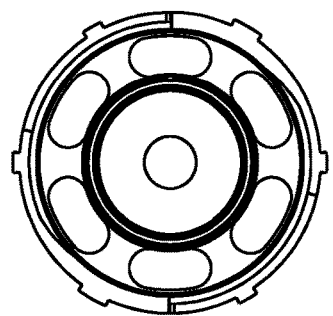
FIG. 23
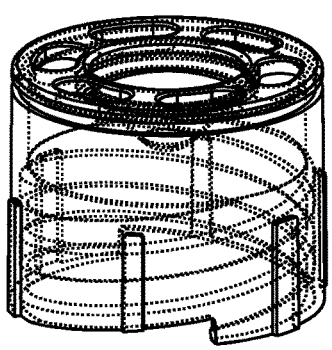
FIG. 24

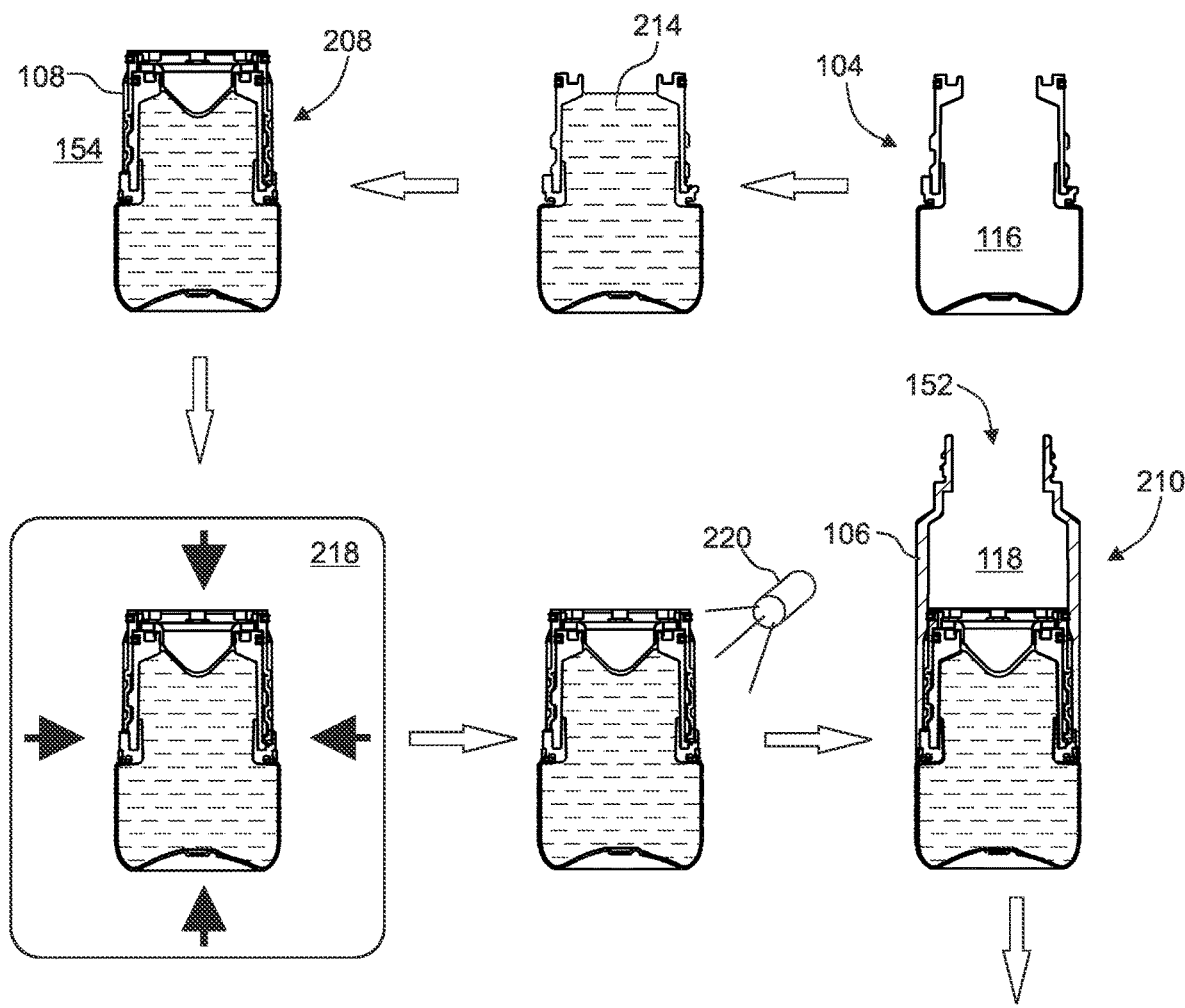
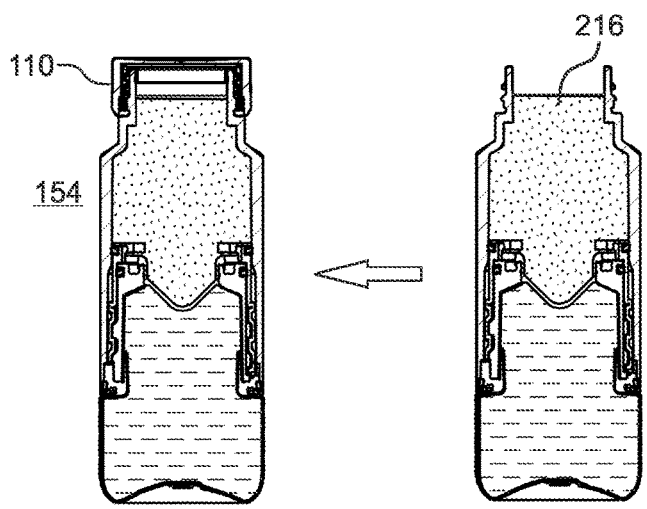
FIG. 70

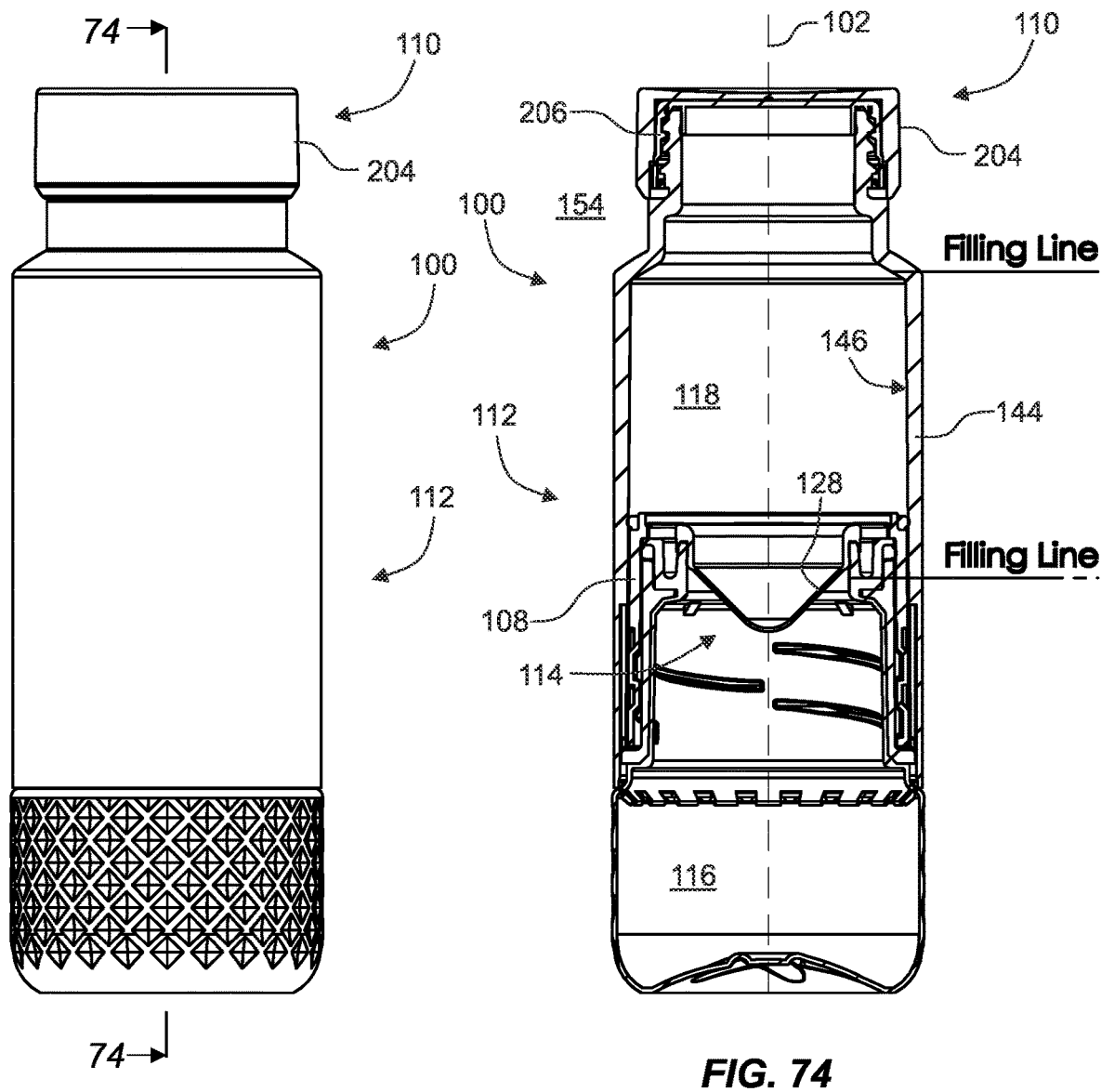
FIG. 74
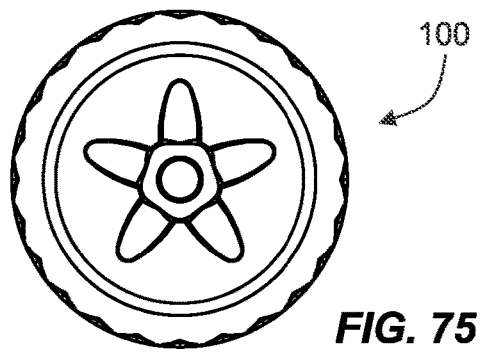
FIG. 73
FIG. 75

Two thread P=20.0

MULTI-COMPARTMENT BEVERAGE BOTTLE SYSTEM AND METHOD

RELATED APPLICATIONS

This application is a divisional of U.S. patent application Ser. No. 16/611,855, which is a U.S. national stage of PCT International Patent Application No. PCT/US2019/035086 having an international filing date of May 31, 2019, which claims the benefit of U.S. Provisional Application No. 62/679,578 filed Jun. 1, 2018, and U.S. Provisional Application No. 62/770,657 filed Nov. 21, 2018. All of the above-identified applications are hereby incorporated by reference in their entireties as though fully and completely set forth herein.

TECHNICAL FIELD

The present disclosure relates generally to consumer packaging for retail sale that is designed to safely store a product designated for human consumption, such as a beverage container or bottle. More particularly, the present disclosure relates to a hermetically-sealed multi-chamber beverage container configured to store and transport one or more beverage ingredients, and to provide a consumer-operated or server-operated mixing mechanism at the point of consumption.

BACKGROUND

An enormous market for consumer beverage products exists for both alcoholic and non-alcoholic beverages and more recently many alcoholic cocktail drinks or alcoholic mixed beverages are being sold in premixed form, including margaritas, daiquiris, etc.

Ready-to-drink cocktails currently sold in grocery stores typically contain an alcohol in the form of beer, malt liquor or distilled spirits premixed with a pasteurized juice or flavor mix, which includes additional natural and artificial preservatives, colorants, and stabilizers. This standard formulation available to consumers has many disadvantages that can be solved using innovative container technology.

Liquid storage containers have been provided in numerous shapes and sizes for various liquid commodities. Today's most common liquid storage containers are plastic and provide multiple shapes and sizes with mass production capability and recyclable materials. A popular liquid storage container designed for beverage consumption is a drinking bottle, often formed of a molded plastic material. Such beverage bottles may include a removable closure or cap fastened or sealed to a complementary neck at the upper end of the bottle. The bottle body defines an interior chamber communicating with the neck, which is designed to transport and store the consumable beverage.

Materials used to manufacture beverage containers include glass, aluminum, plastic, paperboard or cardboard, and tin. Alcoholic beverage containers are often made from aluminum or glass while non-alcoholic beverage containers or drink mixes are often made from plastic or paperboard. Instead of purchasing alcohol solely from bars and restaurants by the glass, alcoholic beverages are available for consumer purchase in off-site retail locations. Such alcoholic beverages packaged for retail sale include beer, wine, distilled spirits, and blends with nonalcoholic liquids. Finally, consumer trends continue to advance toward healthier beverages or foodstuffs that are created from natural and organic ingredients rather than processed foods or those with preservatives. This trend is beginning to be reflected with alcohol beverages, as exemplified by an increasing amount of low-calorie, gluten-free, and organic options.

Juices and other liquids are commonly sold in retail locations. In the last decade, a variety of raw juice products, which are not pasteurized or possess preservatives of any kind, whether natural or not, nor additional colorants or flavor enhancers, are becoming increasingly popular. Their popularity is predicated upon improved taste and health benefits, as compared to traditional pasteurized products, as well as their convenience, compared to juicing a whole fruit or vegetable with a juicing machine or by hand. Some companies are also developing raw juice brands that are to be used as mixers for alcoholic beverages. A consumer purchases the raw juice and alcohol separately, combining the two liquids when ready for consumption.

Generally, there are two classes of raw beverages, whether they be juice, coffee, tea, soups or other food stuffs: ones that are widely distributed with a shelf life over a month, and those which are not distributed and possess a shelf life of a few days. In order to increase the shelf life of a product without pasteurizing it and enabling a company to widely distribute a raw product, it must undergo high pressure processing ("HPP"). In order to increase the shelf life of the raw juice (for example, from two days to two months refrigerated), it will undergo HPP, which typically place 80,000 pounds of pressure per square inch submersed in water in a high-pressure chamber.

In the beverage industry generally, a number of products include a dispensing cap or secondary chamber on top of a plastic bottle used for beverages. Such dispensing caps are used to separate a secondary liquid from the primary liquid below in order to preserve the liquid in the secondary chamber or to create a unique experience, whether the liquid is a flavor enhancer, vitamin, probiotic or other nutraceutical, alcoholic, or any other liquid. By keeping the two liquids separated until consumption, each liquid is not diluted or negatively affected if mixed for days, months, or even years.

SUMMARY

Exemplary systems and methods of the present disclosure are directed to multi-chamber beverage bottles designed to preserve the freshness of individual ingredients bottled in each chamber while also allowing a consumer or server to easily mix the ingredients at the point of consumption using a simple twisting motion as part of a fun and satisfying way to open the beverage container.

BRIEF DESCRIPTION OF THE DRAWINGS

Further advantages of the present invention may become apparent to those skilled in the art with the benefit of the following detailed description of the preferred embodiments and upon reference to the accompanying drawings in which:

FIG. 8 is a diagrammatic perspective view of an example first housing element in accordance with the example beverage bottle system of FIG. 1;

FIG. 9 is a further diagrammatic perspective view of the first housing element shown in FIG. 8;

FIG. 10 is a diagrammatic side view of the first housing element shown in FIG. 8;

FIG. 11 is a diagrammatic cross-sectional view taken along lines 11-11 in FIG. 10;

FIG. 12 is a diagrammatic side view similar to that of FIG. 10, but wherein the first housing element is at least semitransparent;

FIG. 13 is a diagrammatic perspective view of the first housing element of FIG. 12;

FIG. 18 is a diagrammatic perspective view of a shuttle element in accordance with the example beverage bottle system of FIG. 1;

FIG. 19 is a further diagrammatic perspective view of the shuttle element of FIG. 18;

FIG. 20 is a diagrammatic side view of the shuttle element of FIG. 18;

FIG. 21 is a diagrammatic cross-sectional view taken along lines 21-21 in FIG. 20;

FIG. 22 is a diagrammatic top view of the shuttle element of FIG. 18;

FIG. 23 is a diagrammatic bottom view of the shuttle element of FIG. 18;

FIG. 24 is a further diagrammatic perspective view of the shuttle element of FIG. 18, but wherein the shuttle element is at least semitransparent;

FIG. 70 is a diagrammatic chart illustrating the process in accordance with FIG. 67 as applied to one of the embodiments of a bottle system disclosed and illustrated herein;

FIG. 73 is a diagrammatic side view of a third example multi-compartment beverage bottle system in accordance with the present disclosure;

FIG. 74 is a diagrammatic cross-sectional view taken along lines 74-74 in FIG. 73, showing the beverage bottle system in a seal configuration wherein the first housing element is in a storage position and the shuttle element in a seal position FIG. 75 is a diagrammatic bottom view of the bottle of FIG. 73;

DETAILED DESCRIPTION OF THE PREFERRED EMBODIMENTS

Figure 1:
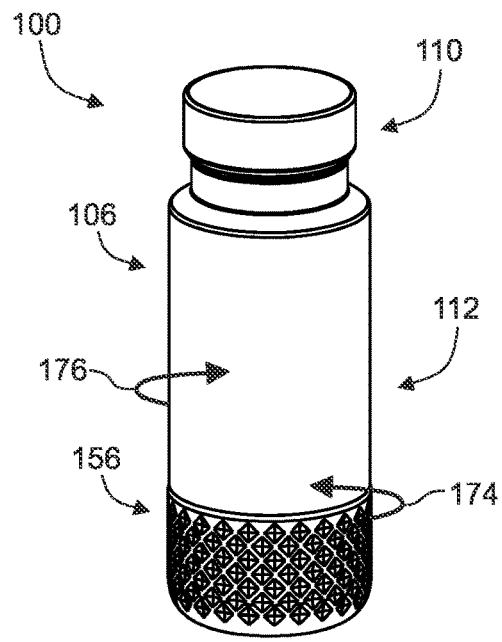
FIG. 1 is a diagrammatic perspective view of one example multi-compartment beverage bottle system in accordance with the present disclosure.
Figure 2:
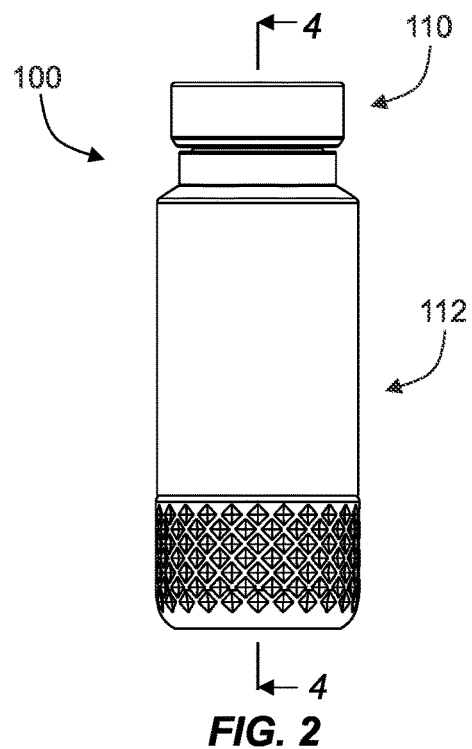
FIG. 2 is a diagrammatic side view of the example beverage bottle system of FIG. 1.

Referring now to the drawings, like reference numerals designate identical or corresponding features throughout the several views.

With reference to the several drawings, various example embodiments of a multi-compartment beverage bottle system are shown at 100, and may preferably comprise a first housing element 104, a second housing element 106, a shuttle element 108 and a closure element 110.

Referring to FIGS. 1-5, 41-45, and 73-76 the first housing element 104 and second housing element 106 may be in mutual engagement with one another to at least partially define a fluid vessel 112 with a fluid cavity 114 therein. The fluid cavity 114 may include a first fluid compartment 116 and a second fluid compartment 118. The first housing element 104 may be rotatable with respect to the second housing element 106 about a main axis 102 for rotation of the first housing element 104 between a storage position and a mix position.

The shuttle element 108 may be disposed within the fluid cavity 114 and axially actuatable along the main axis 102 into and out of a seal position. FIGS. 4, 6, 44 and 46 illustrate embodiments of the system 100 with the shuttle element 108 depicted in the seal position. Contrastingly, FIGS. 5, 7, 45 and 47 illustrate embodiments of the system 100 with the shuttle element 108 depicted out of the seal position. The beverage bottle system 100 may be configured such that (a) rotation of the first housing element 104 toward the storage position actuates the shuttle element 108 toward the seal position; (b) rotation of the first housing element 104 toward the mix position actuates the shuttle element 108 away from the seal position; (c) the first and second fluid compartments are sealed from fluid communication with one another when the shuttle element 108 is in the seal position; and (d) the first and second fluid compartments are in fluid communication with one another when the shuttle element 108 is not in the seal position.

In particular preferred embodiments of the multi-compartment beverage bottle system 100, (a) the first housing element 104 may include a shuttle transport portion 162; (b) the shuttle element 108 may include a transport sleeve 164 in threaded engagement with the shuttle transport portion 162; and (c) the actuations of the shuttle element 108 may be configured to be by way of the threaded engagement. The threaded engagement may be between transport threading 196 on the shuttle transport portion 162 and shuttle threading 198 in the shuttle element 108.

Referring to FIGS. 4, 5, 44, 45 and 74 in certain preferred embodiments of the system 100, the first housing element 104 may include a valve seat 120 with a valve aperture 126 extending therethrough. The valve aperture 126 may be configured to be in fluid communication between the first and second fluid compartments (116 and 118). Moreover, the shuttle element 108 may include a valve plug 128 configured to sealingly engage the valve aperture 126 when the shuttle element 108 is in its seal position. The valve plug 128 may be conical, semispherical, or the like.

Figure 7:
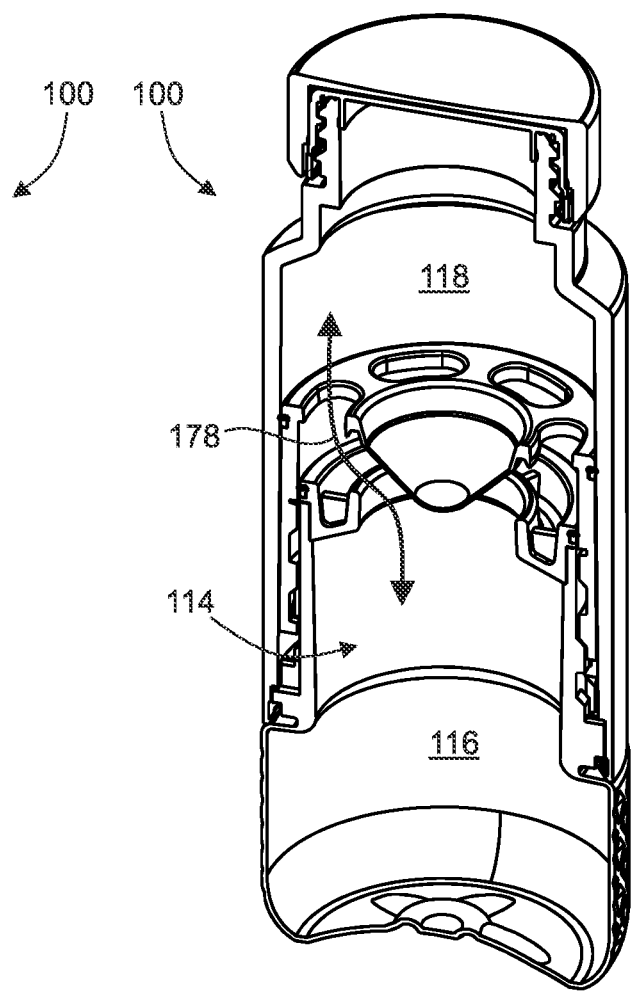
FIG. 7 is a diagrammatic perspective cut away view wherein the cut is taken along lines 4-4 in FIG. 2, and showing the beverage bottle system in a mix configuration wherein the first housing element is in a mix position and the shuttle element is out of its seal position.
Figure 47:
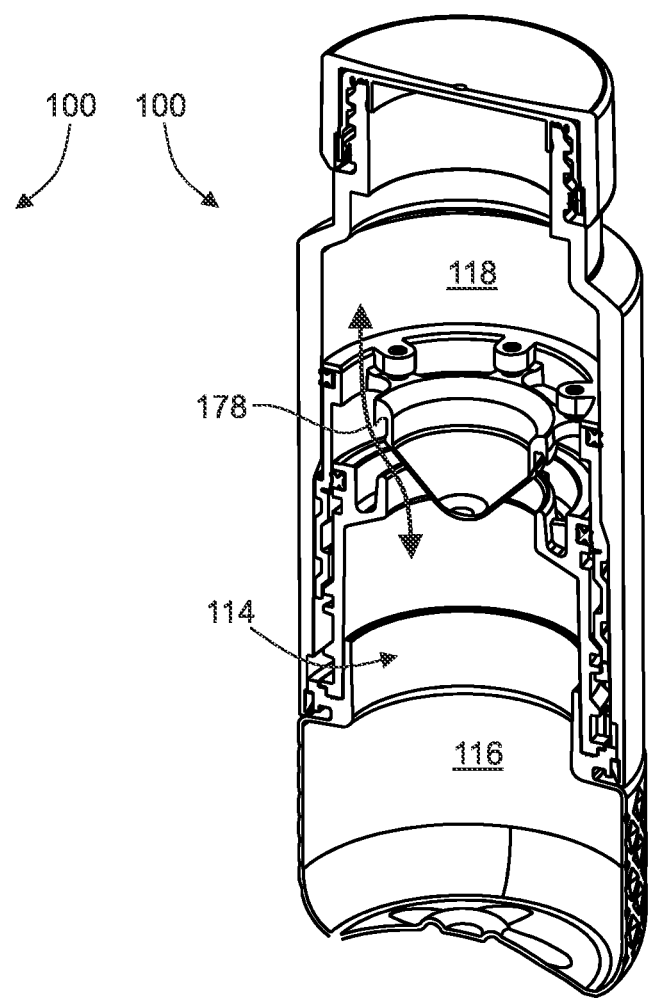
FIG. 47 is a diagrammatic perspective cut away view wherein the cut is taken along lines 44-44 in FIG. 42, and showing the beverage bottle system in a mix configuration wherein the first housing element is in a mix position and the shuttle element is out of its seal position.
Figure 48:
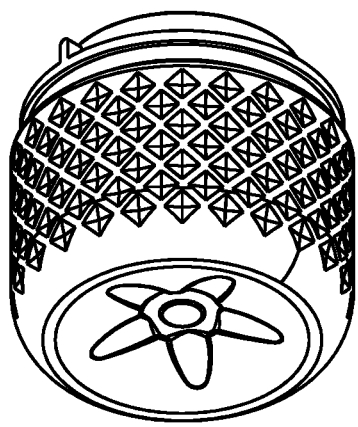
FIG. 48 is a diagrammatic perspective view of a base portion of the example beverage bottle system of FIG. 41.
Figure 49:
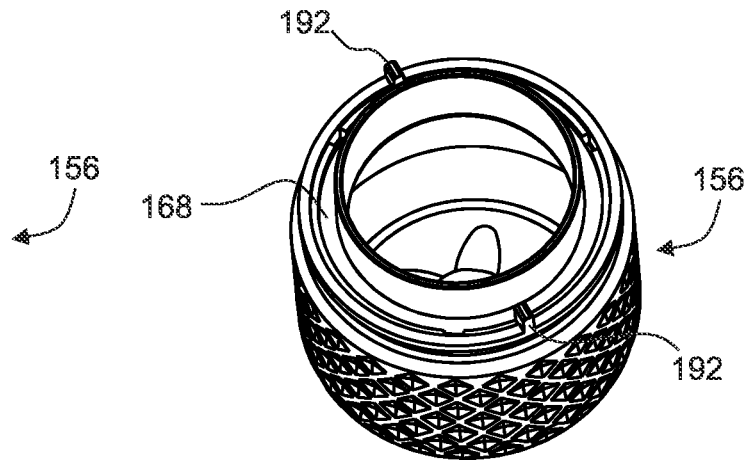
FIG. 49 is a further diagrammatic perspective view of the base portion of FIG. 48.
Figure 50:
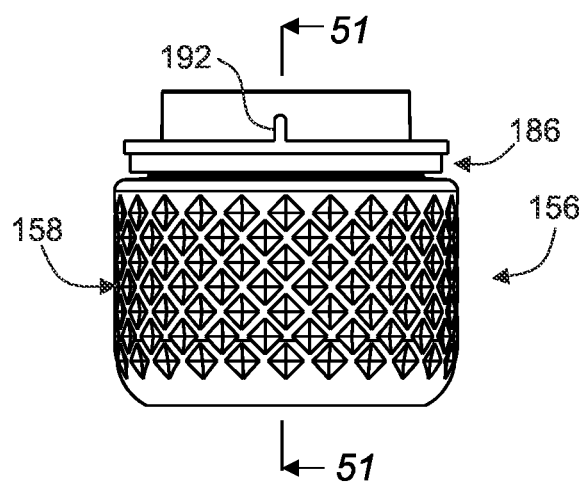
FIG. 50 is a diagrammatic side view of the base portion of FIG. 48.
Figure 51:
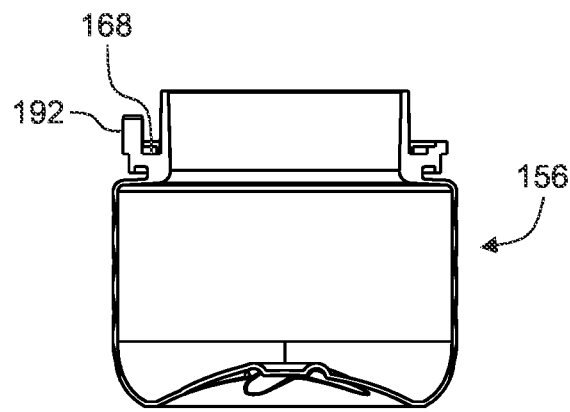
FIG. 51 is a diagrammatic cross-sectional view taken along lines 51-51 in FIG. 50.
Figure 52:
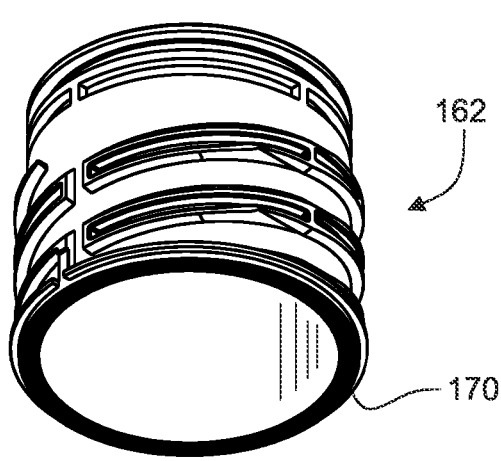
FIG. 52 is a diagrammatic perspective view of a shuttle transport portion of the example beverage bottle system of FIG. 41.
Figure 59:
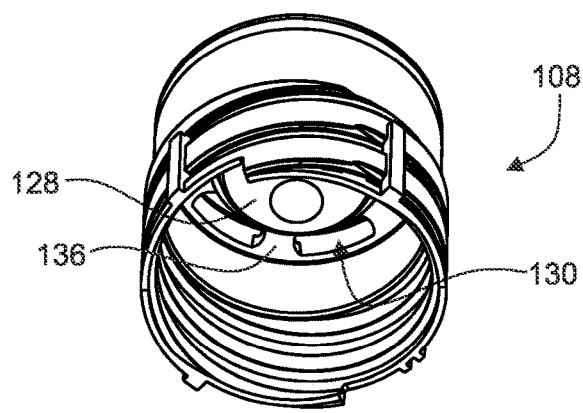
FIG. 59 is a further diagrammatic perspective view of the shuttle element of FIG. 58.

Referring to FIGS. 22 and 59, the shuttle element 108 may include plurality of flow apertures 130 radially disposed about the valve plug 128. Referring to FIGS. 7 and 47, the flow apertures 130 may be configured to provide fluid communication pathways 178 between the first fluid compartment 116 and second fluid compartment 118 when the beverage bottle system 100 in its mix configuration.

Figures 4, 5:
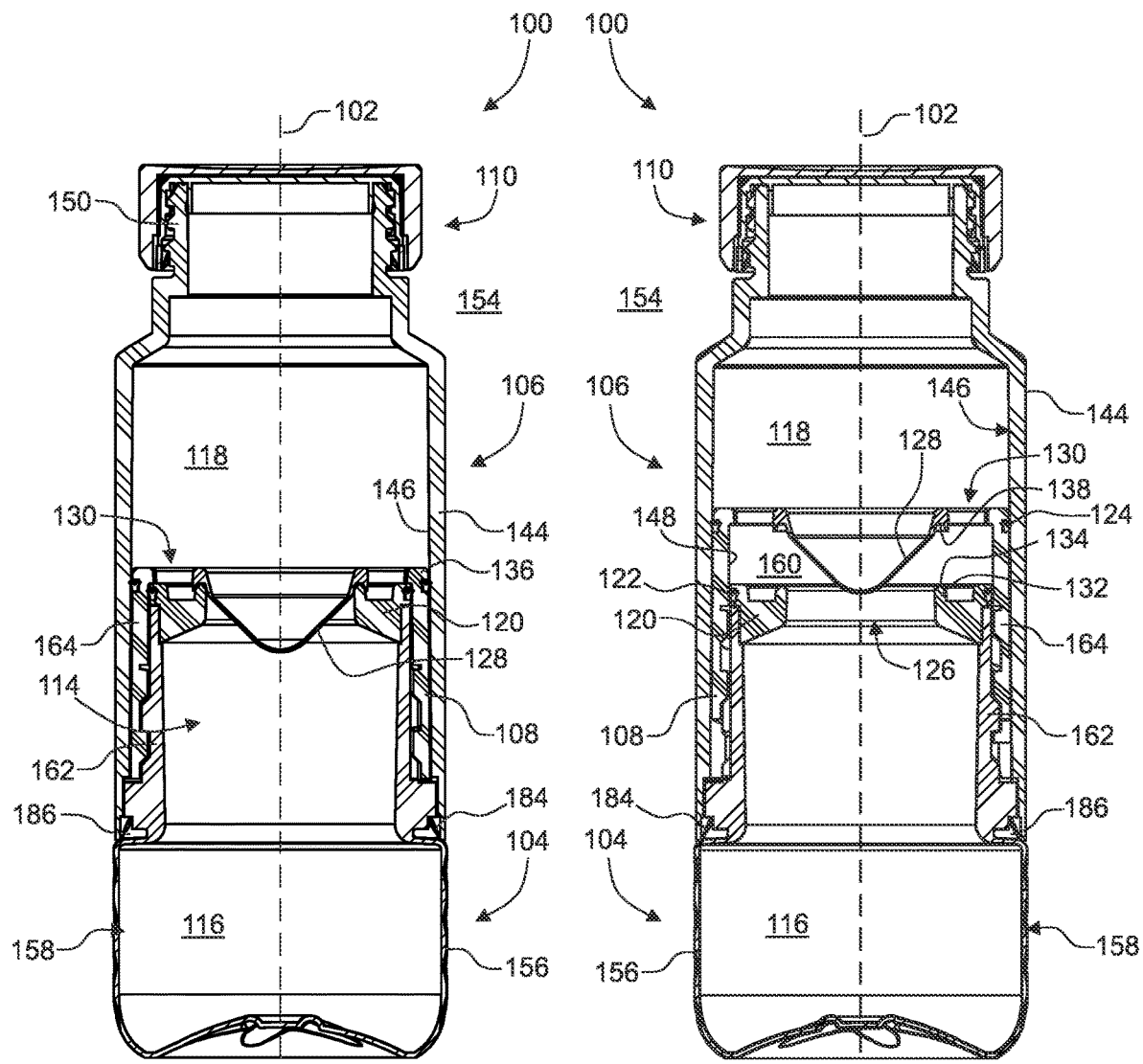
FIG. 4 is a diagrammatic cross-sectional view taken along lines 4-4 in FIG. 2, showing the beverage bottle system in a seal configuration wherein the first housing element is in a storage position and the shuttle element in a seal position.
FIG. 5 is a further diagrammatic cross-sectional view taken along lines 4-4 in FIG. 2, but showing the beverage bottle system in a mix configuration wherein the first housing element is in a mix position and the shuttle element is out of its seal position.
Figure 6:
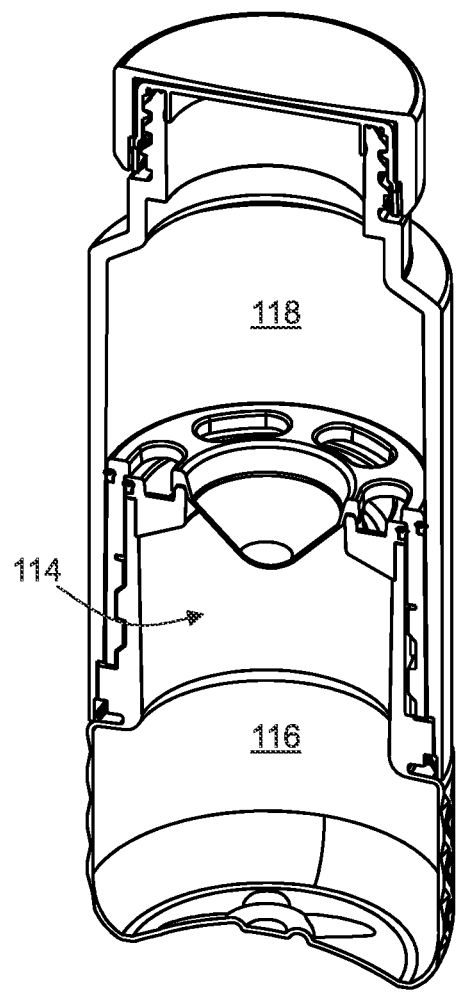
FIG. 6 is a diagrammatic perspective cut away view wherein the cut is taken along lines 4-4 in FIG. 2, and showing the beverage bottle system in a seal configuration wherein the first housing element is in a storage position and the shuttle element in a seal position.
Figures 44, 45:
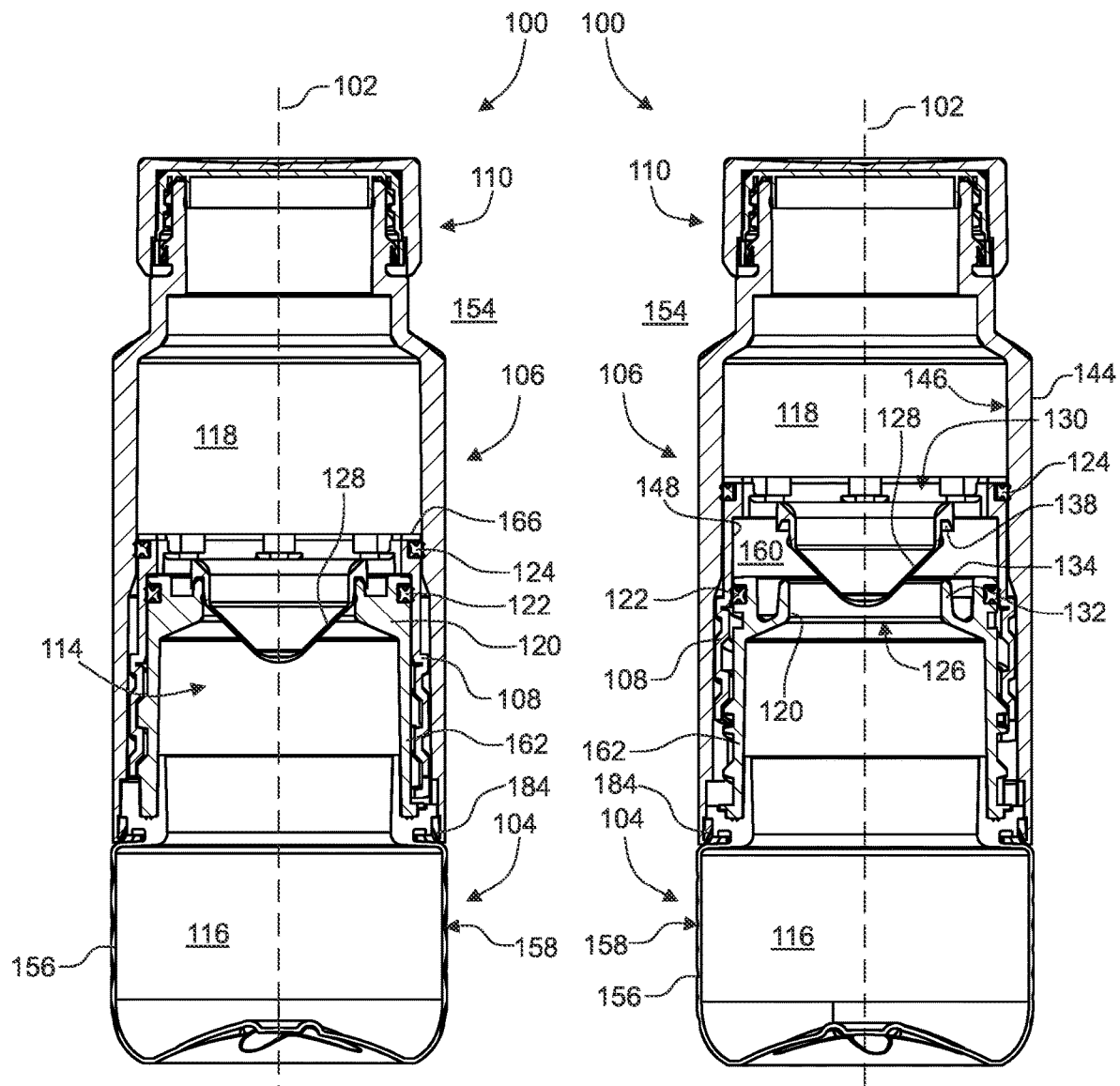
FIG. 44 is a diagrammatic cross-sectional view taken along lines 44-44 in FIG. 42, showing the beverage bottle system in a seal configuration wherein the first housing element is in a storage position and the shuttle element in a seal position.
FIG. 45 is a further diagrammatic cross-sectional view taken along lines 44-44 in FIG. 42, but showing the beverage bottle system in a mix configuration wherein the first housing element is in a mix position and the shuttle element is out of its seal position.
Figure 46:
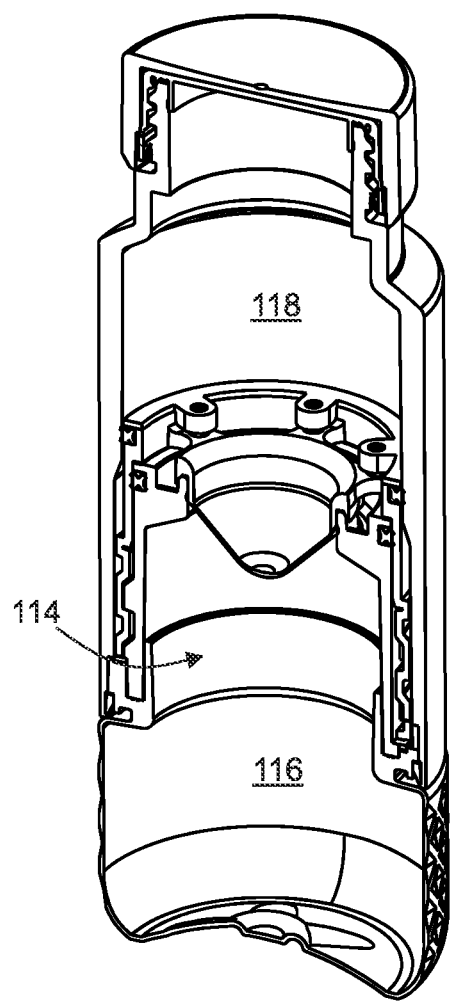
FIG. 46 is a diagrammatic perspective cut away view wherein the cut is taken along lines 44-44 in FIG. 42, and showing the beverage bottle system in a seal configuration wherein the first housing element is in a storage position and the shuttle element in a seal position.

Referring to FIGS. 5 and 45, in particular preferred embodiments of a beverage bottle system 100, the valve seat 120 may include an annular seat flange 132 extending axially outward of the valve aperture 126 and may terminate at a flange lip 134. The shuttle element 108 may include a plug retention portion 136 on which the valve plug 128 is mounted The plug retention portion 136 may include an annular lip groove 138 extending circumferentially about the valve plug 128. Referring to FIGS. 4 and 44, the lip groove 138 may be configured to be in sealing receipt of the flange lip 134 when the shuttle element 108 is in the seal position.

In certain embodiments of a beverage bottle system 100, the shuttle element 108 and the second housing element 106 may be (a) axially-slidable with respect to one another along the main axis and (b) non-rotatable with respect to one another about the main axis 102. Referring to FIGS. 15, 20, 58, 63, 77 and 85 this axially-slidability and non-rotatability may be by way of mutual engagement between respective linear splines 140 and linear grooves 142. Moreover, the second housing element 106 may include a sidewall portion 144 having a sidewall inner surface 146. The linear splines 140 may be distributed about the transport sleeve 164 and the linear grooves 142 may be distributed about the sidewall inner surface 146.

Notably, in the bottle system 100 of FIGS. 73-106, the linear grooves 142 are configured in shape and numerosity to further facilitate axial receipt of the shuttle element 104 by the second housing element 106 during initial assembly of the bottle system 100. By way of example, as illustrated in FIGS. 76, 77, 80 and 84, the linear grooves 142 are evenly distributed circumferentially about the inner surface 146 of the sidewall portion 144, and feature tapered groove inlets toward the proximal end 180 of the second housing element 106. As a result of this construction, the linear splines 140 of the shuttle element 108 can be received any of the numerous linear grooves 142 of the second housing element 106 during assembly of the bottle system 100. Thus, the second housing element 106 can be axially slid into engagement with the shuttle element 108 and first housing element 104 during the bottle assembly process with little or no regard to the initial rotational orientation of the second housing element 106 about the main axis 102 with respect to the shuttle element 108.

Figure 54:
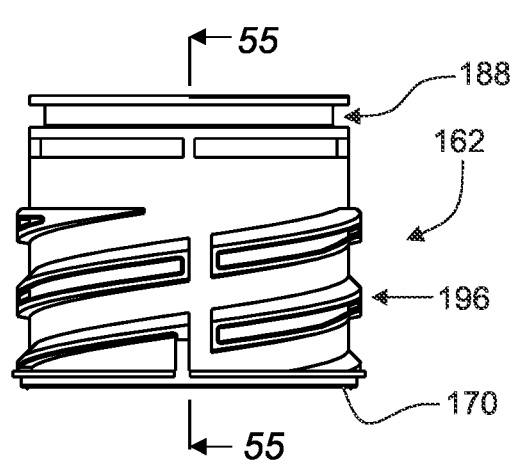
FIG. 54 is a diagrammatic side view of the base portion of FIG. 52.
Figure 55:
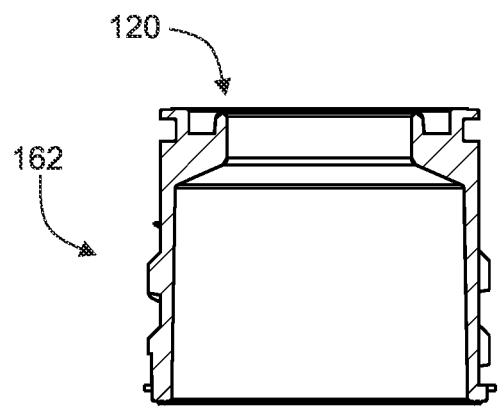
FIG. 55 is a diagrammatic cross-sectional view taken along lines 55-55 in FIG. 54.
Figure 56:
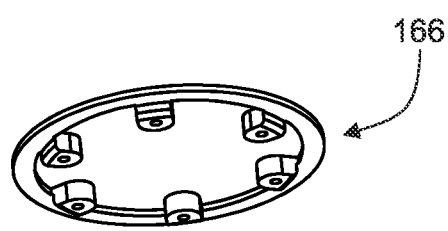
FIG. 56 is a diagrammatic perspective view of a shuttle seal flange of the beverage bottle system of FIG. 41.
Figure 57:
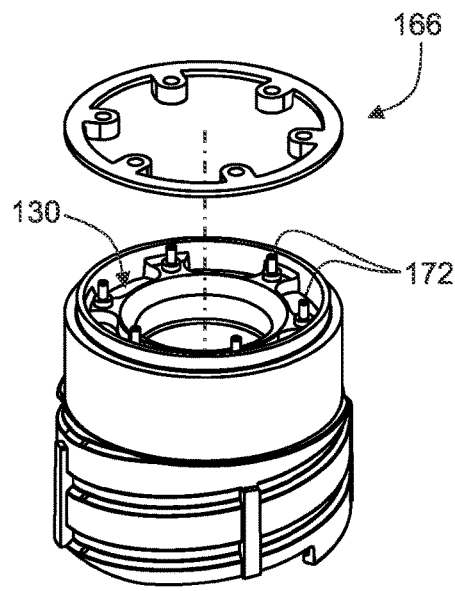
FIG. 57 is a diagrammatic exploded view of a shuttle element of the beverage bottle system of FIG. 41, wherein the shuttle seal flange is shown prior to being secured to the reminder of the shuttle element.
Figure 58:
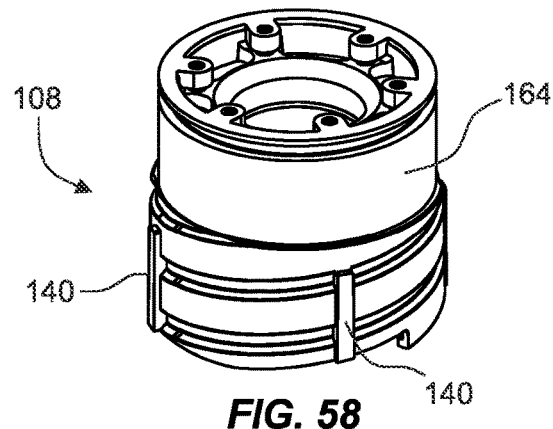
FIG. 58 is a diagrammatic perspective view of a shuttle element similar to that shown in FIG. 41, but wherein the shuttle seal flange is shown secured to the reminder of the shuttle element.

Referring to FIGS. 5 and 45, particular embodiments of a beverage bottle system 100 may further comprise an inboard annular seal 122. The transport sleeve 164 may include a sleeve inner surface 148, and the inboard annular seal 122 may be disposed in fluid-sealing engagement between the shuttle transport portion 162 and the sleeve inner surface 148. Referring to FIGS. 45 and 54, the inboard annular seal 122 may preferably be mounted within an inboard seal groove 188 of the shuttle transport portion 162. Alternatively, referring to FIGS. 104 and 105 for example, the inboard annular seal 122 may be integrally affixed to the shuttle transport portion 162 during formation by way of, for example, bi-injection molding process mutually involving the inboard annual seal 122 and first housing element 104. In such embodiments, the inboard annular seal may preferably be a thermoplastic elastomer (TPE) and the shuttle transport portion 162 may be a rigid plastic such as a polypropylene (PP).

Figure 60:
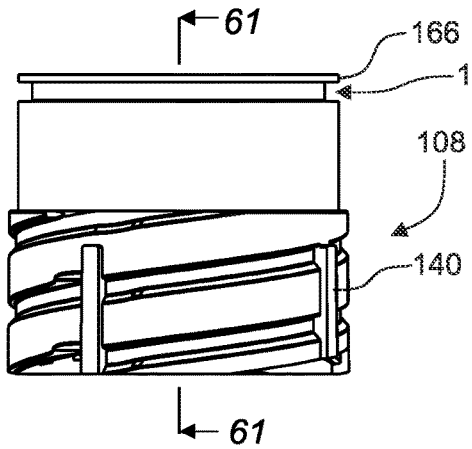
FIG. 60 is a diagrammatic side view of the base portion of FIG. 58.

Referring again to FIGS. 5 and 45, certain embodiments of a beverage bottle system 100 may further comprise an outboard annular seal 124. The second housing element 106 may include a sidewall portion 144 having a sidewall inner surface 146, and the outboard annular seal 124 may be disposed in fluid-sealing engagement between the shuttle element 108 and the sidewall inner surface 146. Referring to FIGS. 45 and 60, the outboard annular seal 124 may be mounted within an outboard seal groove 190 in the shuttle element 108. Moreover, referring to FIGS. 45 and 61, in particular embodiments of the beverage bottle system 100, the shuttle element 108 may include a shuttle seal flange 166, and the outboard annual seal 124 may be retained on the shuttle element 108 (and within outboard seal groove 190) by way of the shuttle seal flange 166. Referring to FIGS. 56-61, the shuttle element 108 may include a plurality of flange securement bosses 172 configured to extend through corresponding apertures in the shuttle seal flange 166 to facilitate fixed securement of the shuttle seal flange 166 to the remainder of the shuttle element 108. For example, the ends of the flange securement bosses 172 may be heat-staked to secure the shuttle seal flange 166 in place on the remainder of the shuttle element 108. Alternatively, referring to FIGS. 89 and 92 for example, the outboard annular seal 124 may be integrally affixed to the shuttle element 108 during formation by way of, for example, bi-injection molding process mutually involving the outboard annual seal 124 and shuttle element 108. In such embodiments, the outboard annular seal may preferably be a thermoplastic elastomer (TPE) and the shuttle element 108 may be a rigid plastic such as a polypropylene (PP).

Figure 3:
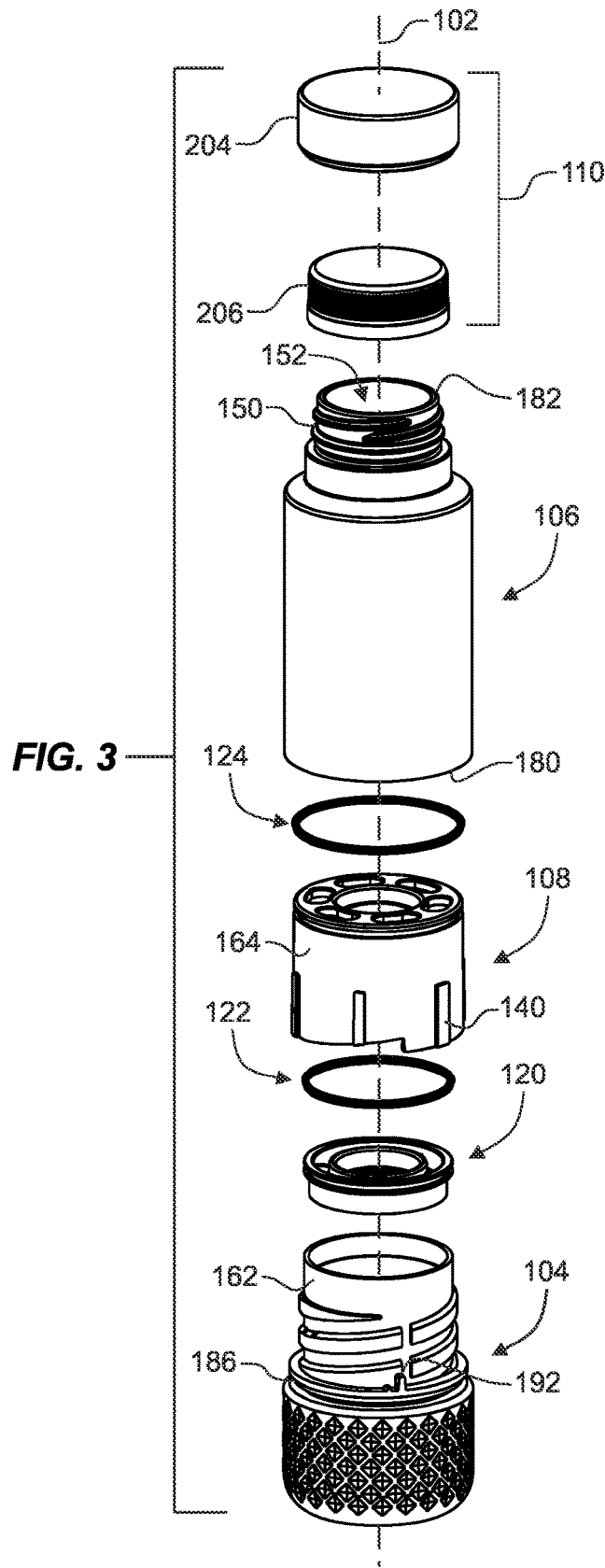
FIG. 3 is a diagrammatic exploded view of the example beverage bottle system of FIG. 1.
Figure 14:
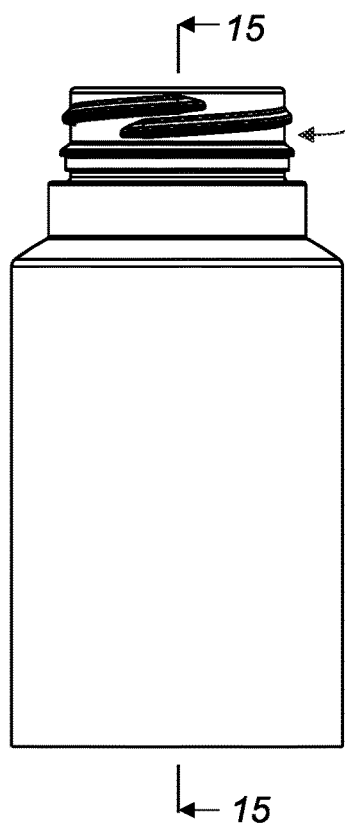
FIG. 14 is a diagrammatic side view of an example second housing element in accordance with the example beverage bottle system of FIG. 1.
Figure 15:
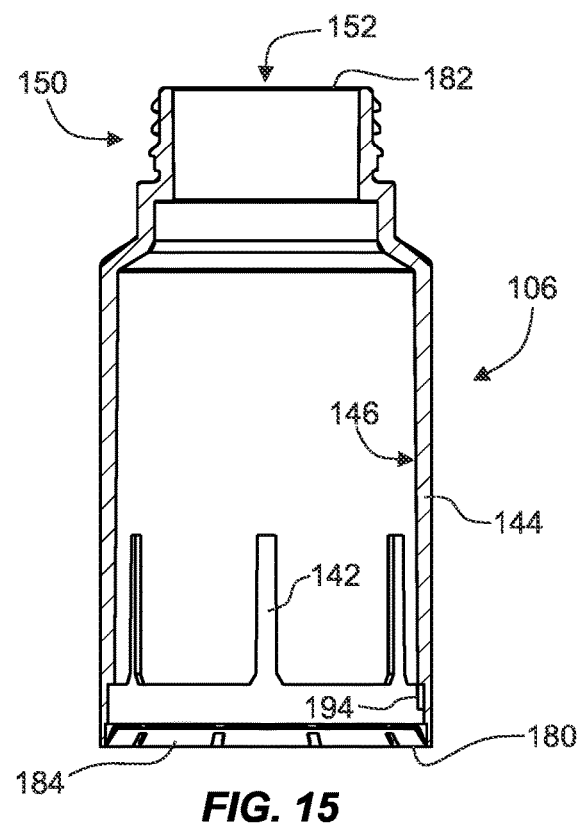
FIG. 15 is a diagrammatic cross-sectional view taken along lines 15-15 in FIG. 14.
Figure 16:
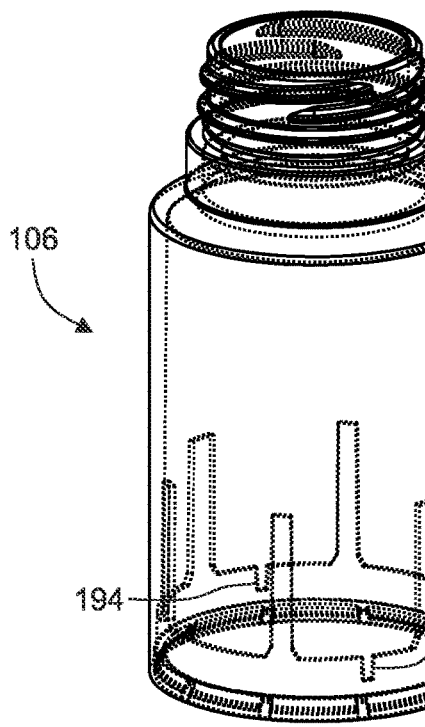
FIG. 16 is a diagrammatic perceptive view of a second housing element similar to that shown in FIG. 14, but wherein the second housing element is at least semitransparent.
Figure 17:
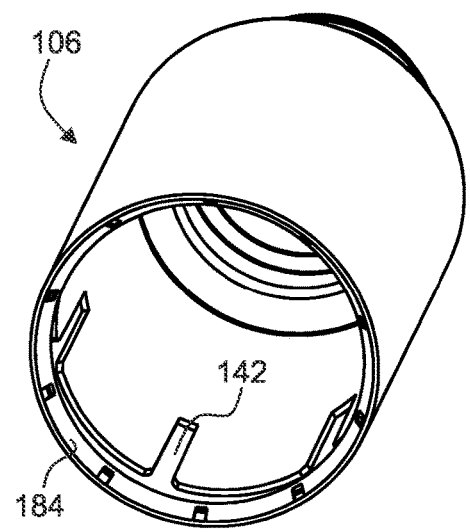
FIG. 17 is a diagrammatic perspective view of the second housing element of FIG. 14.
Figure 25:
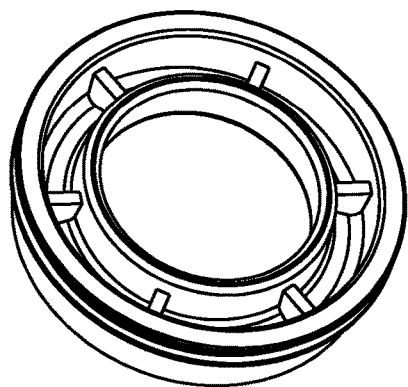
FIG. 25 is a diagrammatic perspective view of a valve seat in accordance with the example beverage bottle system of FIG. 1.
Figure 26:
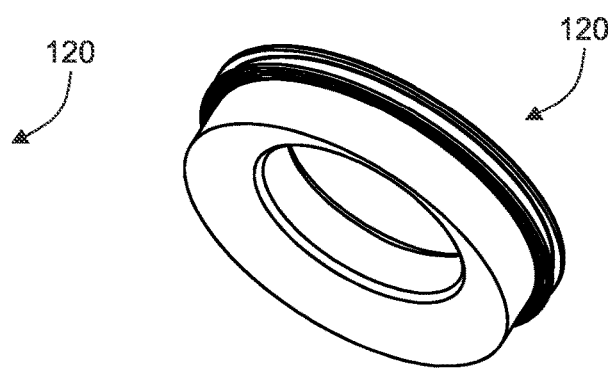
FIG. 26 is a further diagrammatic perspective view of the valve seat of FIG. 25.
Figure 27:
FIG. 27 is a diagrammatic side view of the valve seat of FIG. 25.
Figure 28:
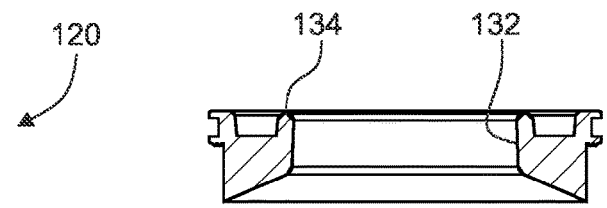
FIG. 28 is a diagrammatic cross-sectional view taken along lines 28-28 in FIG. 27.
Figure 29:
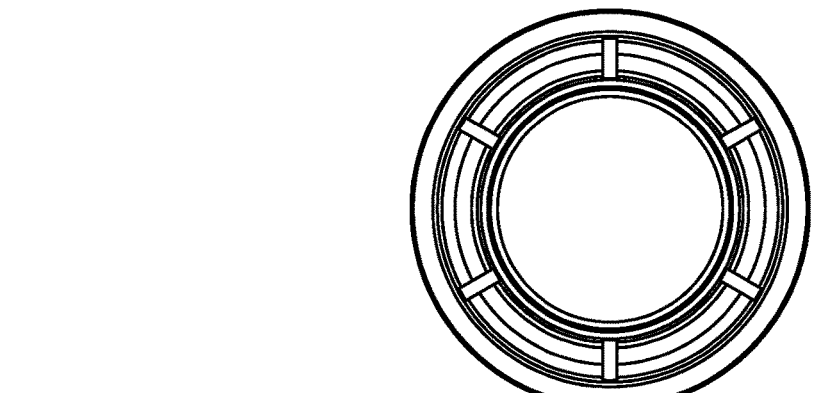
FIG. 29 is a diagrammatic top view of the valve seat of FIG. 25.
Figure 30:
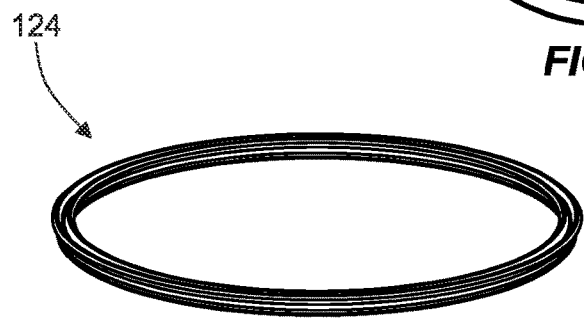
FIG. 30 is a diagrammatic perspective view of an outboard annular seal in accordance with the example beverage bottle system of FIG. 1.
Figure 31:
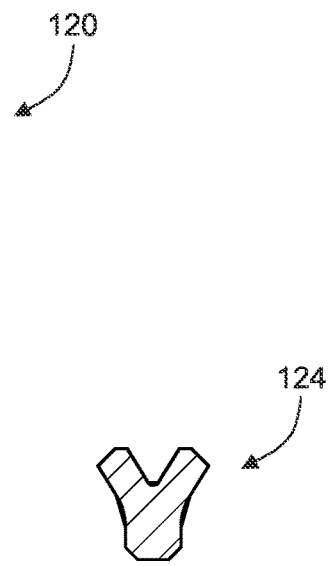
FIG. 31 is a diagrammatic partial cross-sectional view of the outboard annular seal of FIG. 30.
Figure 32:
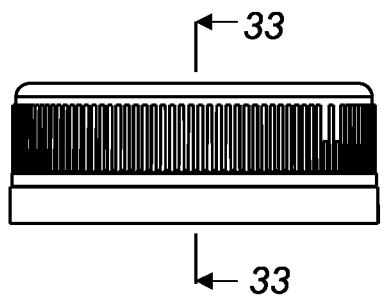
FIG. 32 is a diagrammatic side view of an example inner cap.
Figure 33:
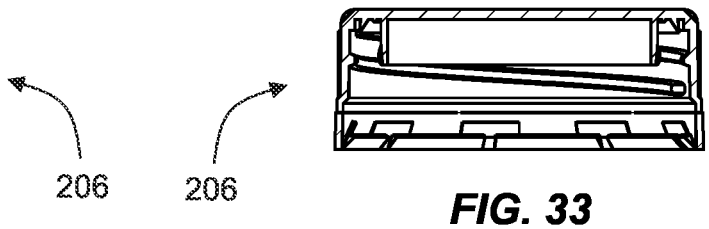
FIG. 33 is a diagrammatic cross-sectional view taken along lines 33-33 in FIG. 32.
Figure 34:
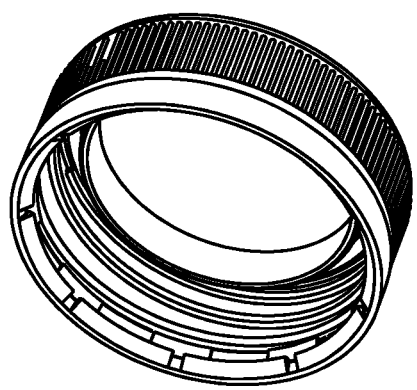
FIG. 34 is a diagrammatic perspective view of the inner cap of FIG. 32.
Figure 35:
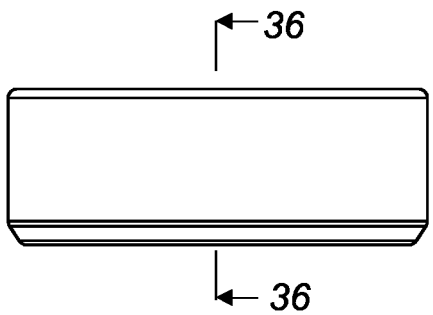
FIG. 35 is a diagrammatic side view of an example over cap.
Figure 36:
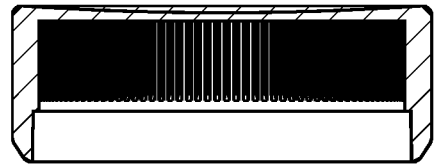
FIG. 36 is a diagrammatic cross-sectional view taken along lines 36-36 in FIG. 35.
Figure 37:
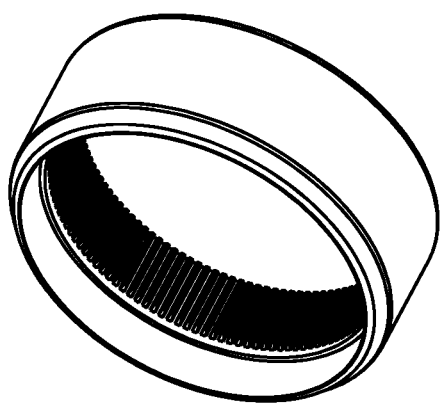
FIG. 37 is a diagrammatic perspective view of the over cap of FIG. 35.
Figure 38:
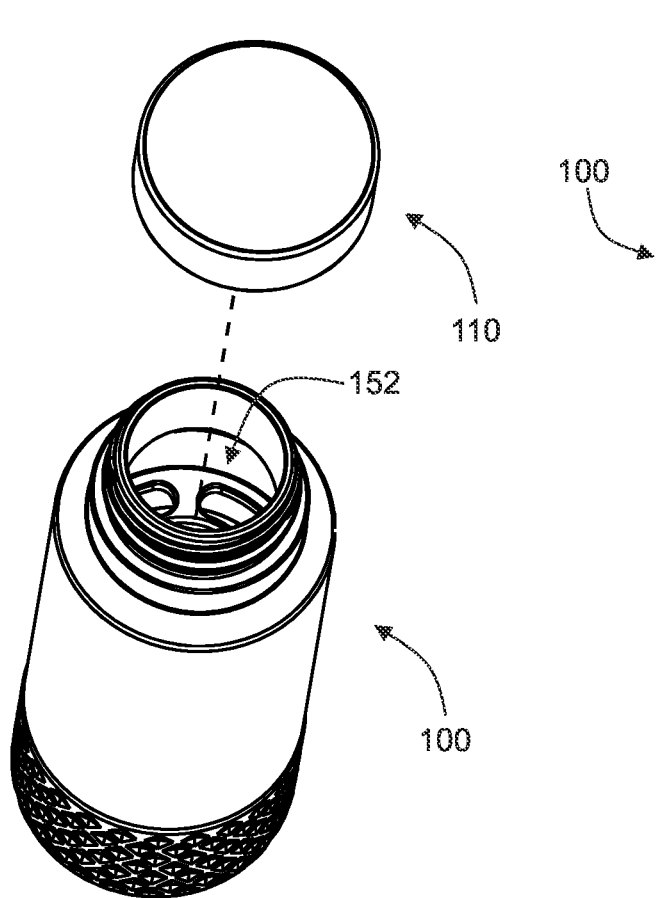
FIG. 38 is a diagrammatic perspective view of the example beverage bottle system of FIG. 1, but with the closure element disengaged from the closure securement portion so as to expose the dispense aperture to fluid communication with the ambient environment.
Figure 39:
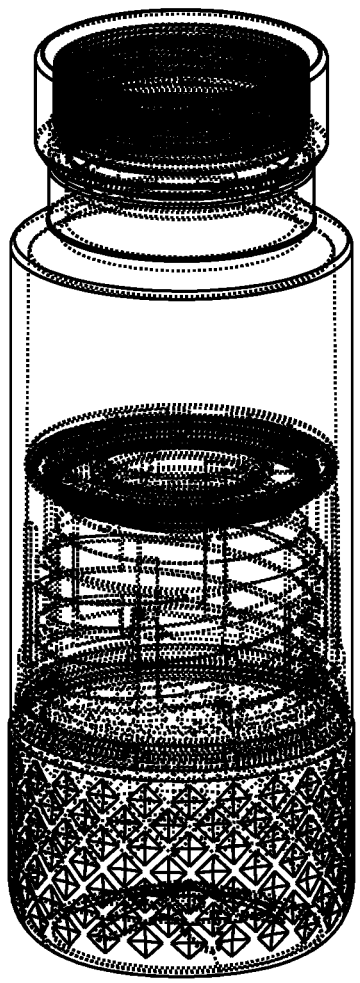
FIG. 39 is a diagrammatic perspective view of the example beverage bottle system of FIG. 1, but with the system components being shown in at least semitransparent form.
Figure 40:
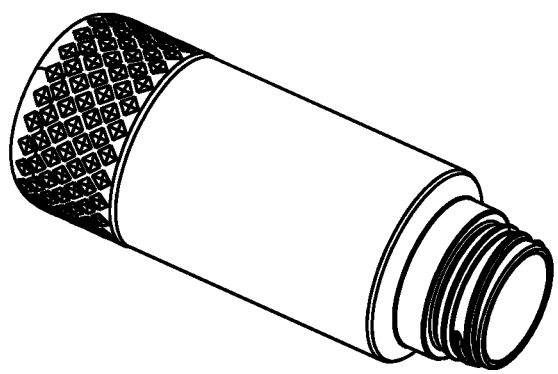
FIG. 40 is a diagrammatic perspective view of the example beverage bottle system of FIG. 1, but with the closure element removed and the system being in a fluid pouring orientation.
Figure 43:
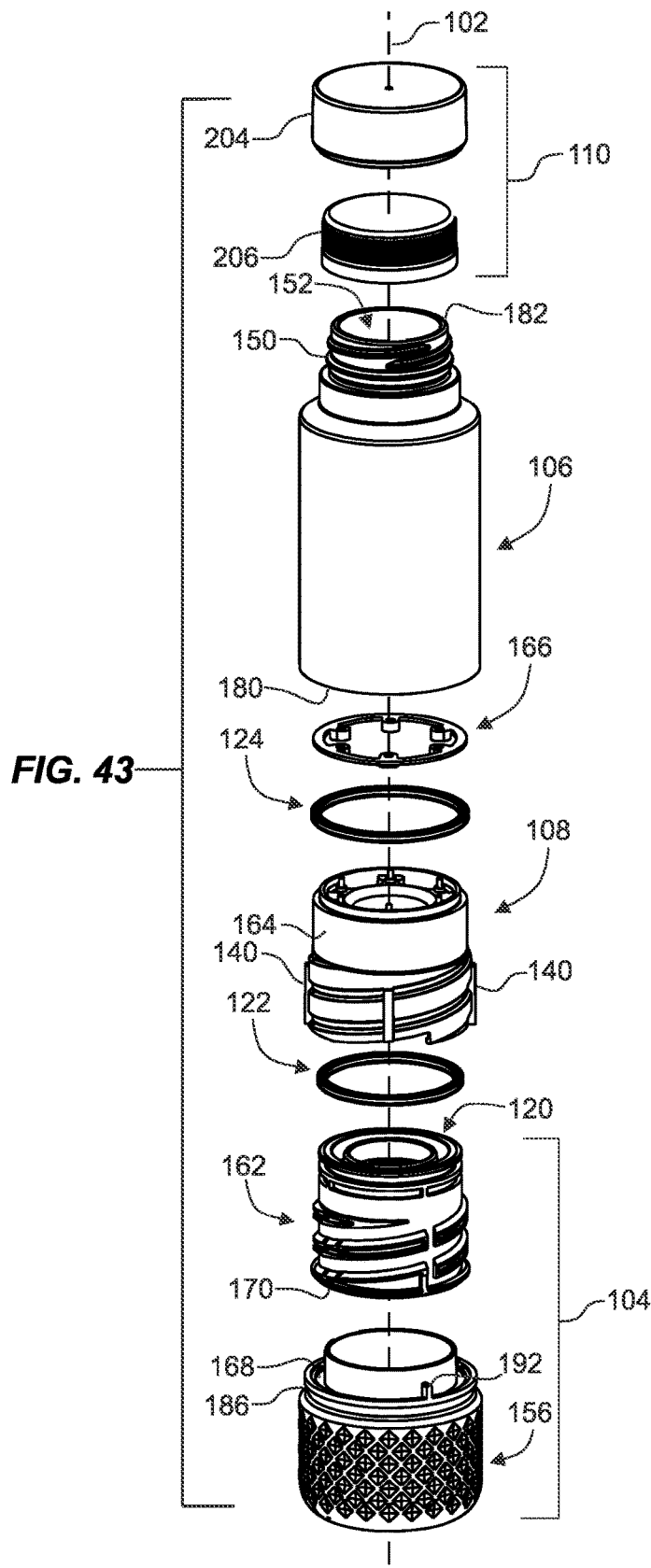
FIG. 43 is a diagrammatic exploded view of the example beverage bottle system of FIG. 41.
Figure 53:
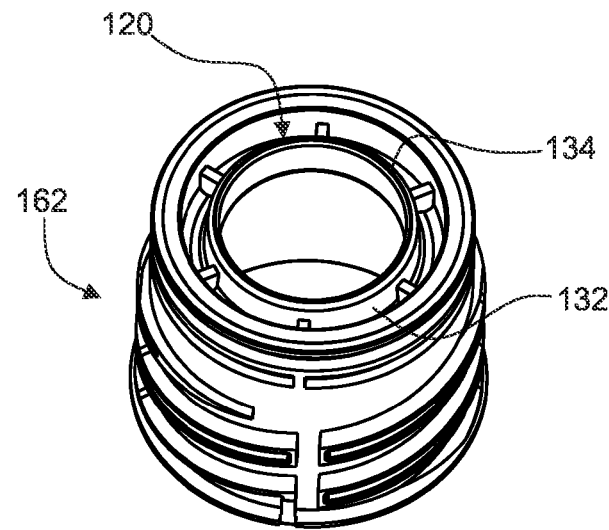
FIG. 53 is a further diagrammatic perspective view of the shuttle transport portion of FIG. 52.

Referring to FIGS. 3 and 53, the second housing element 106 may include a closure securement portion 150 and a dispense aperture 152. Referring to FIGS. 4 and 44, the dispense aperture 152 may be configured to be in fluid communication between the second fluid compartment 118 and the ambient environment 154. The closure element 110 may be configured to (i) engage the closure securement portion 150 to seal the dispense aperture 152 from fluid communication with the ambient environment 154, and (ii) disengage the closure securement portion 150 to expose the dispense aperture 152 to fluid communication with the ambient environment 154. Referring to FIGS. 14 and 34, such engagement and disengagement of the closure element 110 may preferably by way of mutually-engageable threading on the closure securement portion 150 and the closure element 110. Referring to FIGS. 3 and 43, the closure element 110 may be comprised of a mutually-engageable over cap 204 and an inner cap 206

Referring to FIGS. 9, 16, 49 and 65, in particular embodiments of a beverage bottle system 100, the first housing element 104 may include a pair of first rotation detents 192, and the second housing element 106 may include a pair of second rotation detents 194. The first rotation detents 192 may be configured to be engageable with the second rotation detents 194 so as to limit the rotatability between the first housing element 104 and the second housing element 106. For example, such mutual rotatability may preferably be limited to 180 angular degrees or less.

Figure 61:
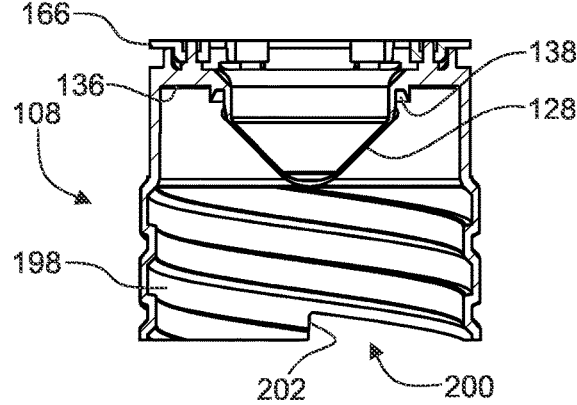
FIG. 61 is a diagrammatic cross-sectional view taken along lines 61-61 in FIG. 60.
Figure 62:
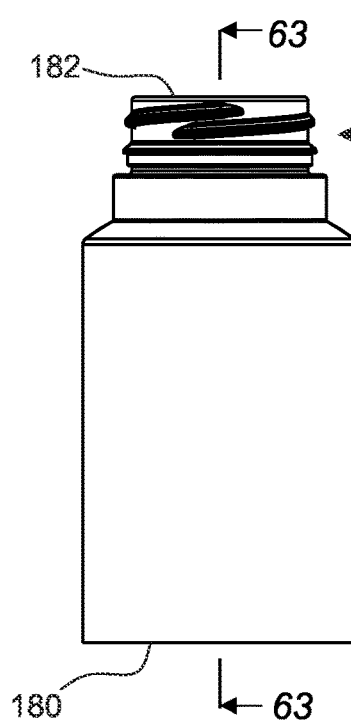
FIG. 62 is a diagrammatic side view of an example second housing element in accordance with the example beverage bottle system of FIG. 41.
Figure 63:
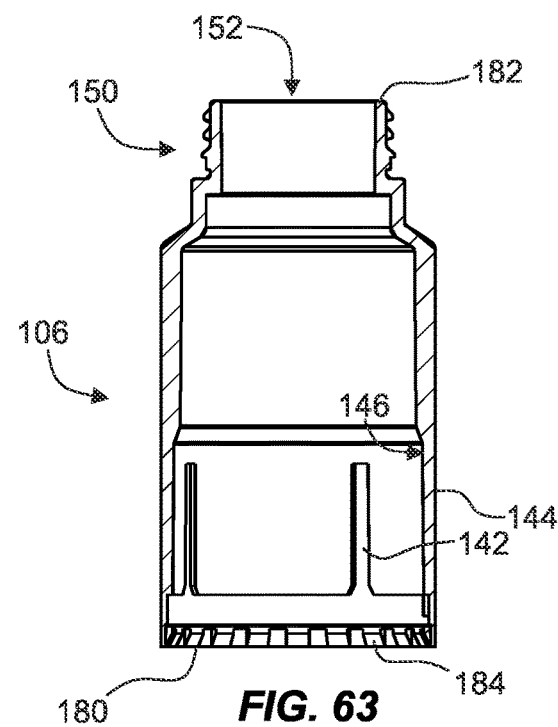
FIG. 63 is a diagrammatic cross-sectional view taken along lines 63-63 in FIG. 62.
Figure 64:
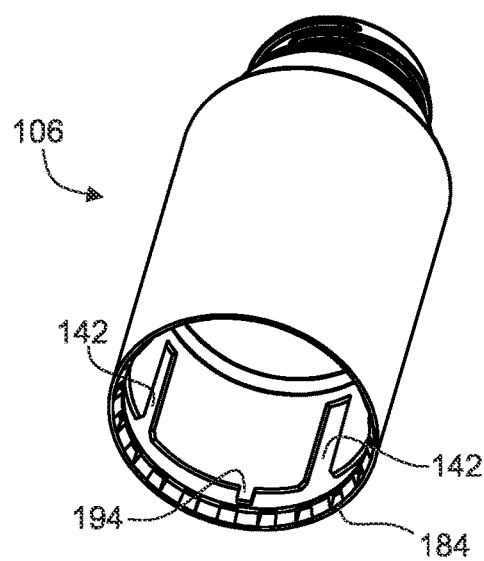
FIG. 64 is a diagrammatic perspective view of the second housing element of FIG. 62.
Figure 65:
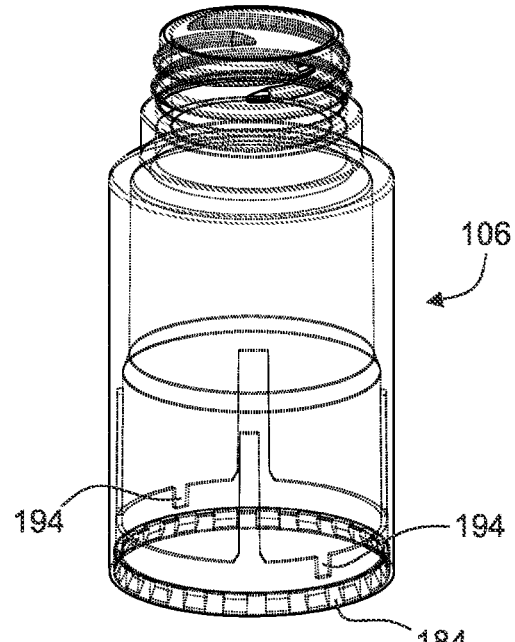
FIG. 65 is a diagrammatic perceptive view of a second housing element similar to that shown in FIG. 62, but wherein the second housing element is at least semitransparent.
Figure 66:
FIG. 66 is a diagrammatic partial cross-sectional view of one example outboard annular seal.

Referring to FIGS. 20 and 61, the shuttle element 108 may include a pair of detent reliefs 200 and corresponding relief terminal faces 202. The detent reliefs 200 may be configured to avoid interference between the first rotation detents 192 and the shuttle element 108 when the shuttle element 108 is being moved into and out of its seal position. The relief terminal faces 202 may be configured to be engaged by respective first rotation detents 192 once the shuttle element 108 reaches its seal position.

Referring to FIGS. 4, 10, 45 and 50, in certain preferred embodiments of a beverage bottle system 100, the first housing element 104 includes a base portion 156 with a circumferentially uneven gripping surface 158 (e.g., knurled, indented, facetted, etc.).

Referring to FIGS. 5 and 45, in particular preferred embodiments of a beverage bottle system 100, an intermediate mixing compartment 160 may be formed between the first fluid compartment 116 and the second fluid compartment 118 when the shuttle element 108 is not in its seal position (e.g., when the system 100 is in its mix configuration as shown in FIGS. 5 and 45).

In preferred embodiments of a beverage bottle system 100 in accordance with the present disclosure, the first fluid chamber 116 contains a first beverage fluid, and the second fluid compartment 118 contains a second beverage fluid different from the first beverage fluid, and the shuttle element 108 is in the seal position. For example, one of the beverage fluids may be alcoholic and the other beverage fluid non-alcoholic.

In certain preferred embodiments of a beverage bottle system 100 in accordance with the present disclosure, the first fluid compartment 116 may have a first compartment pressure, and the second fluid compartment 118 may have a second compartment pressure different from the first compartment pressure (e.g., at least 20 PSI different than the first compartment pressure).

Referring to FIGS. 3, 10, 43 and 50, in a beverage bottle system 100 in accordance with the present disclosure, the first housing element 104 may include an interface securement groove 186 disposed circumferentially thereabout. Moreover, referring to FIGS. 15 and 63, the second housing element 106 may have a proximal end 180, a distal end 182 and an interface securement lip 184. Referring to FIGS. 4 and 44, the interface securement lip 184 may extend circumferentially about the proximal end 180 and be flexibly attached thereto (e.g., via a living hinge) for facilitating hinged movement of the interface securement lip 184 to a radially-inward position with respect to the second housing element 106 (e.g., with respect to the sidewall portion 144). The first housing element 104 and second housing element 106 may be axially secured to one another by way of engagement between the radially-inwardly positioned interface securement lip 184 and the interface securement groove 186.

Referring to FIG. 43, in particular embodiments of a beverage bottle system 100, the base portion 156 and the shuttle transport portion 162 of the first housing element 104 may initially be formed independently of one another. In such case, the first housing element 104 may include a first attachment portion 168 (see, e.g., FIG. 49), and the shuttle transport portion 162 may include a second attachment portion 170 (see, e.g., FIG. 54). Referring now to FIG. 45, the separately-formed base portion 156 and shuttle transport portion 162 may be affixed to one another by way of, for example, ultrasonic weld or adhesion process between the first and second attachment portions. Alternatively, referring to FIGS. 76 and 104-106 for example, a radially-outer segment 162a and radially-inner segment 162b of the shuttle transport portion 162 may be integrally joined during formation of the first housing element 104 by way of, for example, co-molding process mutually involving the radially-outer segment 162a and the remainder of the first housing element 104.

Figure 67:
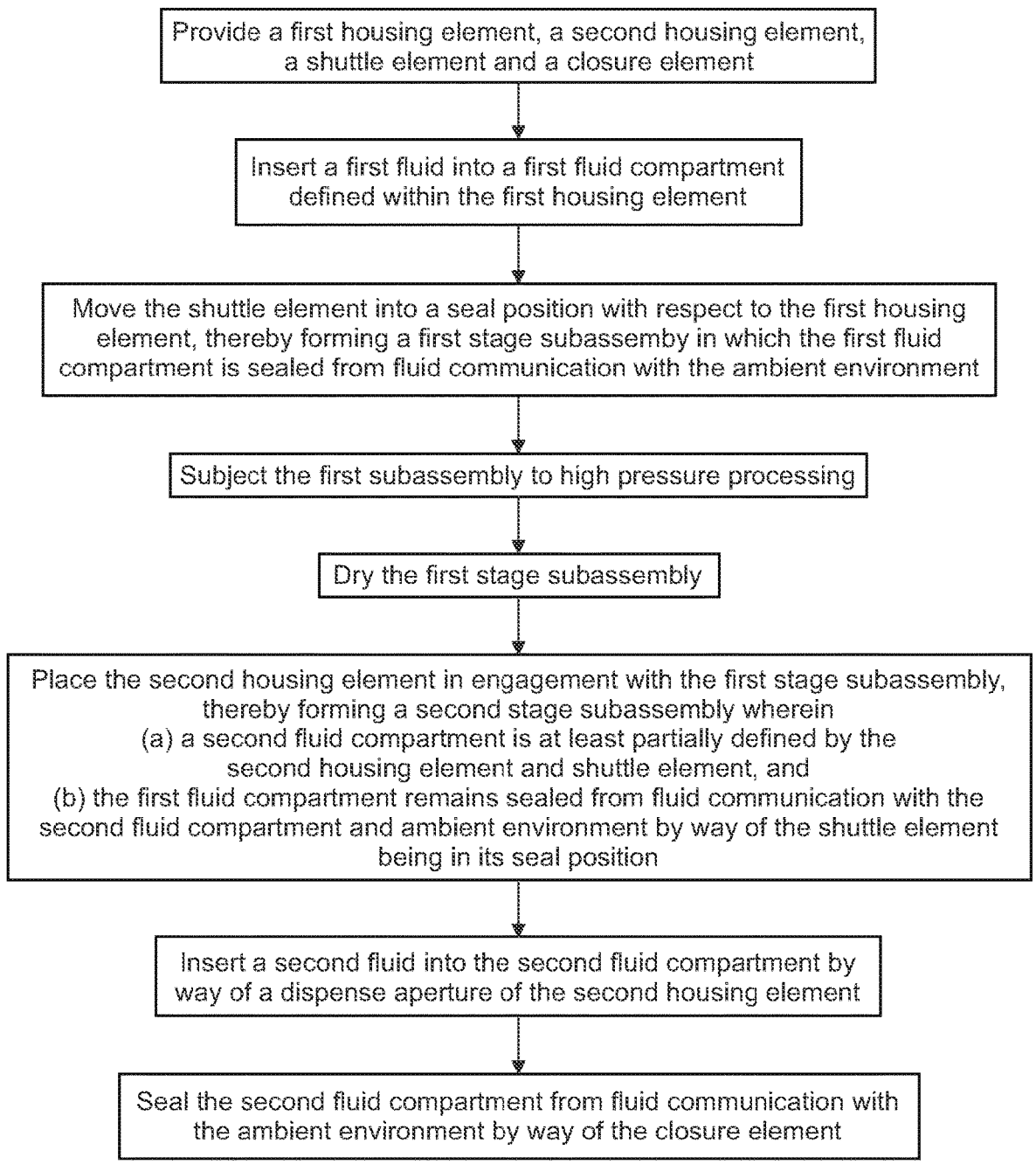
FIG. 67 is a diagrammatic flow chart illustrating of one example of a multi-compartment beverage bottle system fill, HPP and assembly process.
Figure 68:
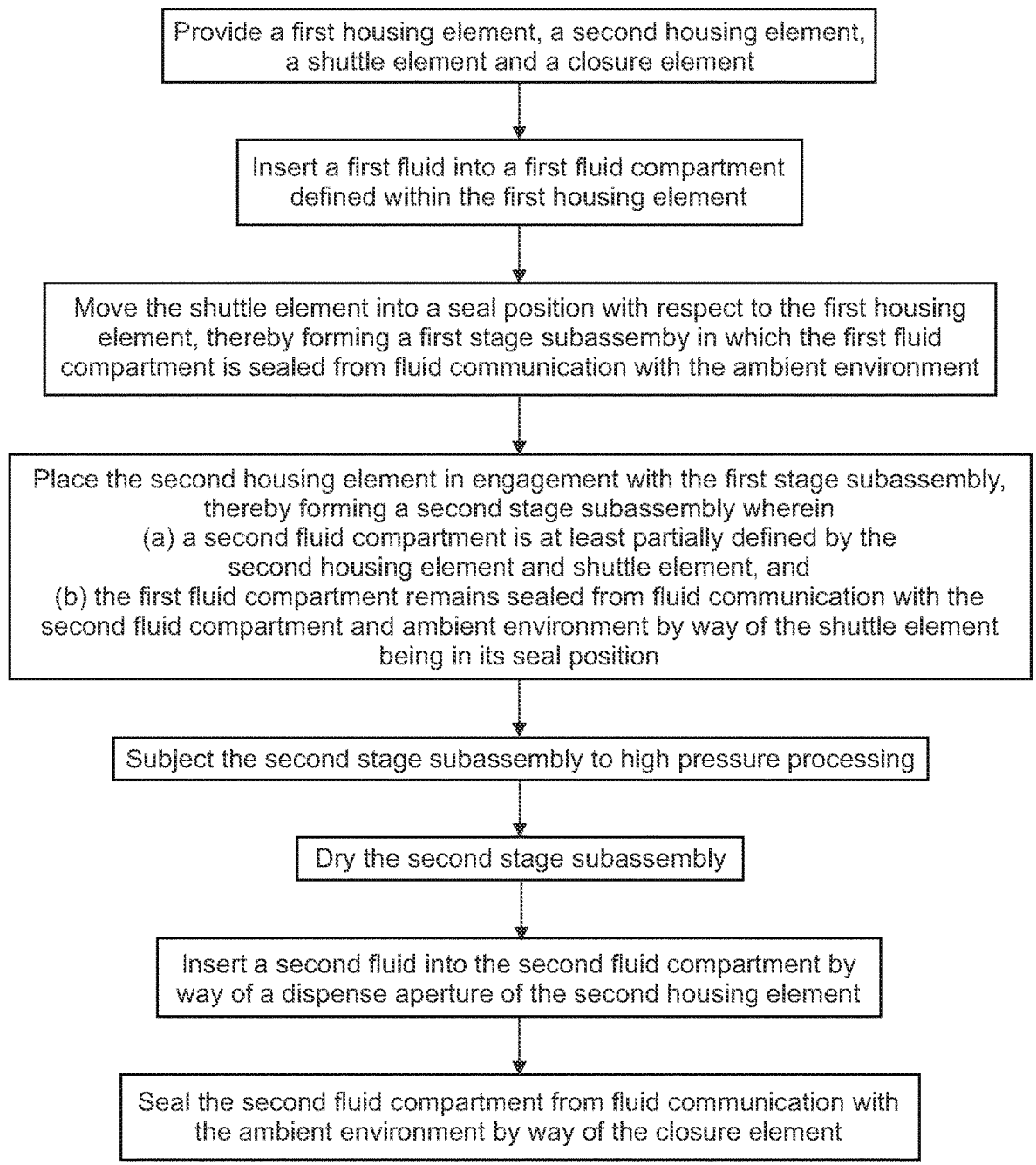
FIG. 68 is a diagrammatic flow chart illustrating of a second example of a multi-compartment beverage bottle system fill, HPP and assembly process.
Figure 69:
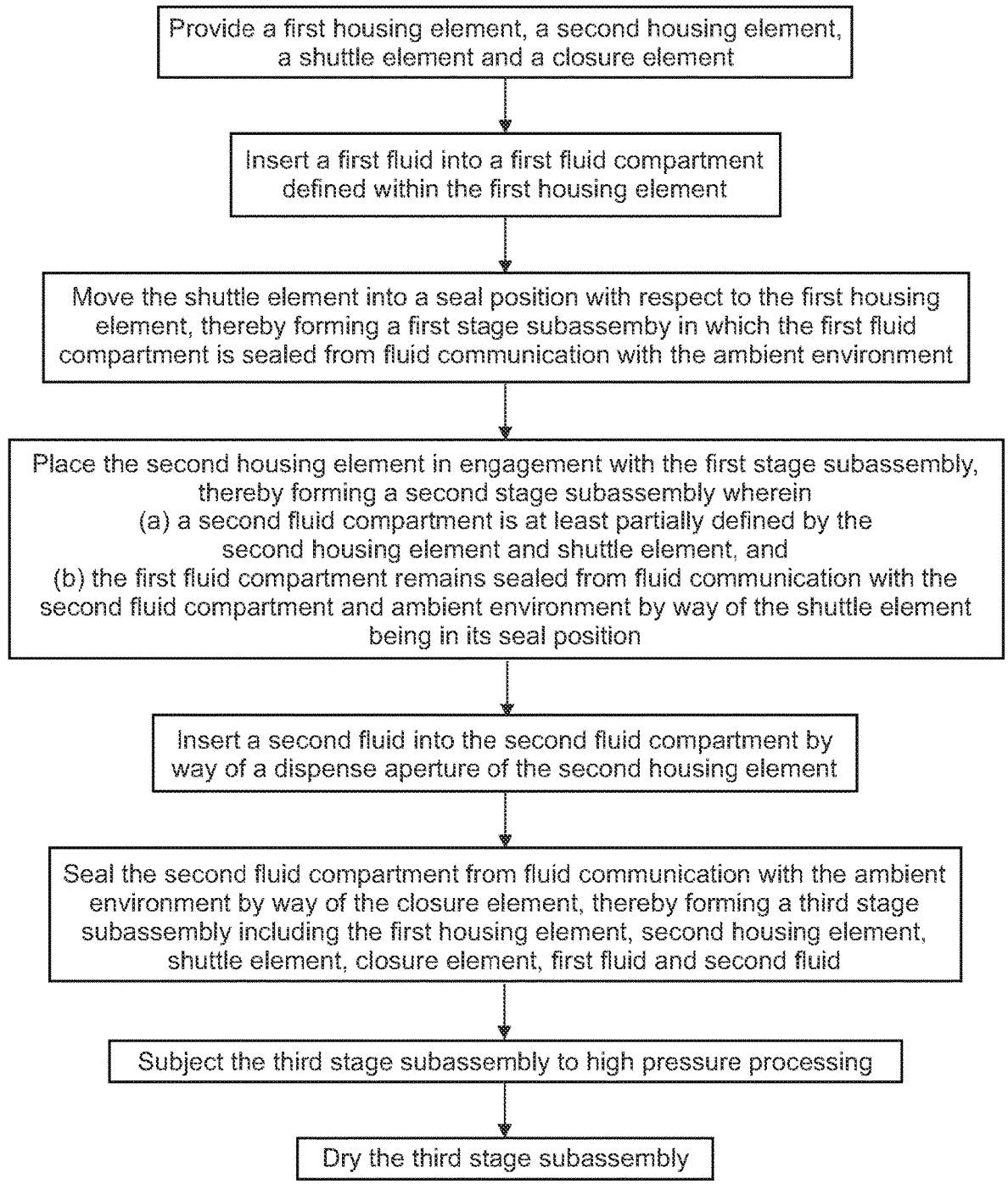
FIG. 69 is a diagrammatic flow chart illustrating of a third example of a multi-compartment beverage bottle system fill, HPP and assembly process.
Figure 71:
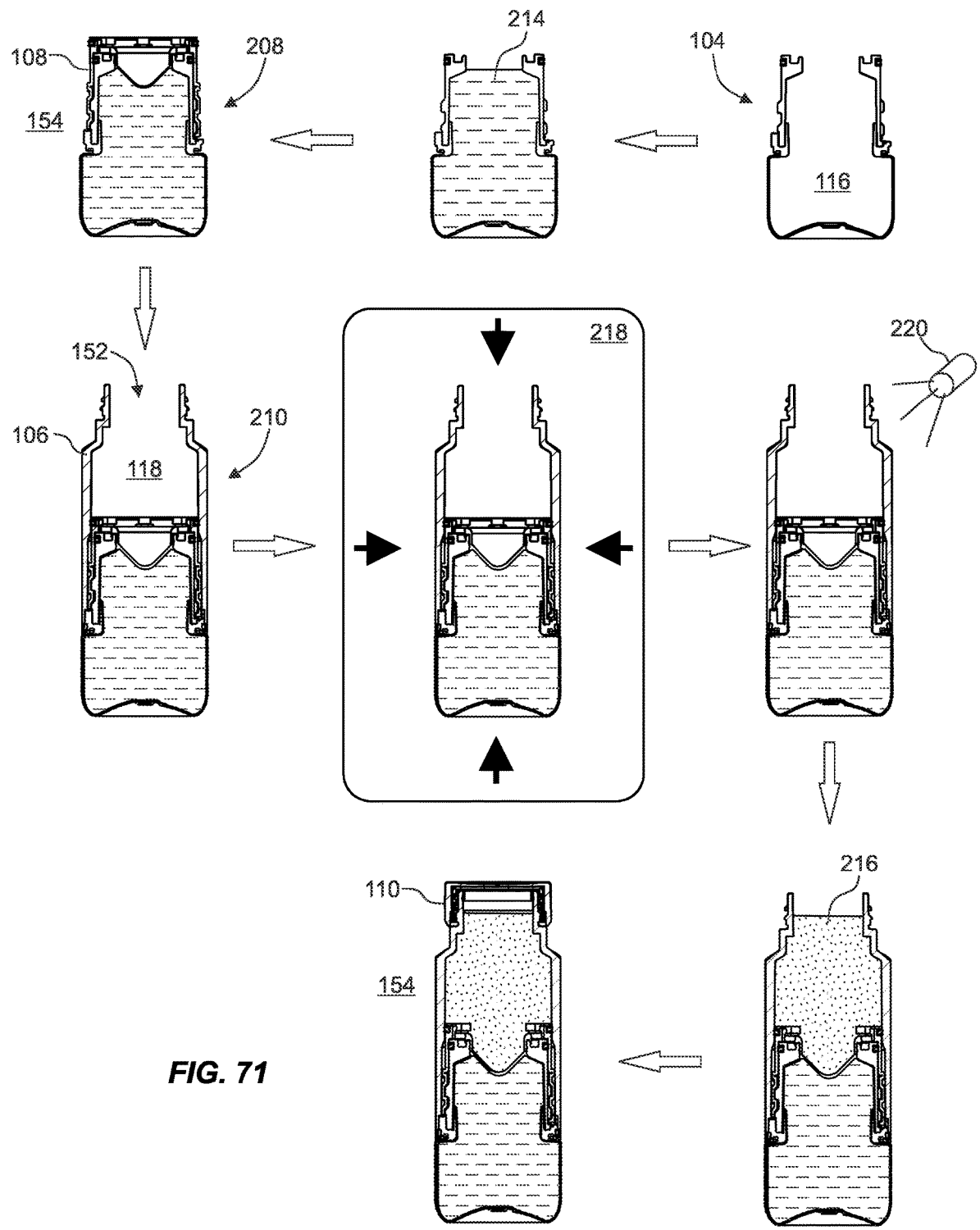
FIG. 71 is a diagrammatic chart illustrating the process in accordance with FIG. 68 as applied to one of the embodiments of a bottle system disclosed and illustrated herein.
Figure 72:
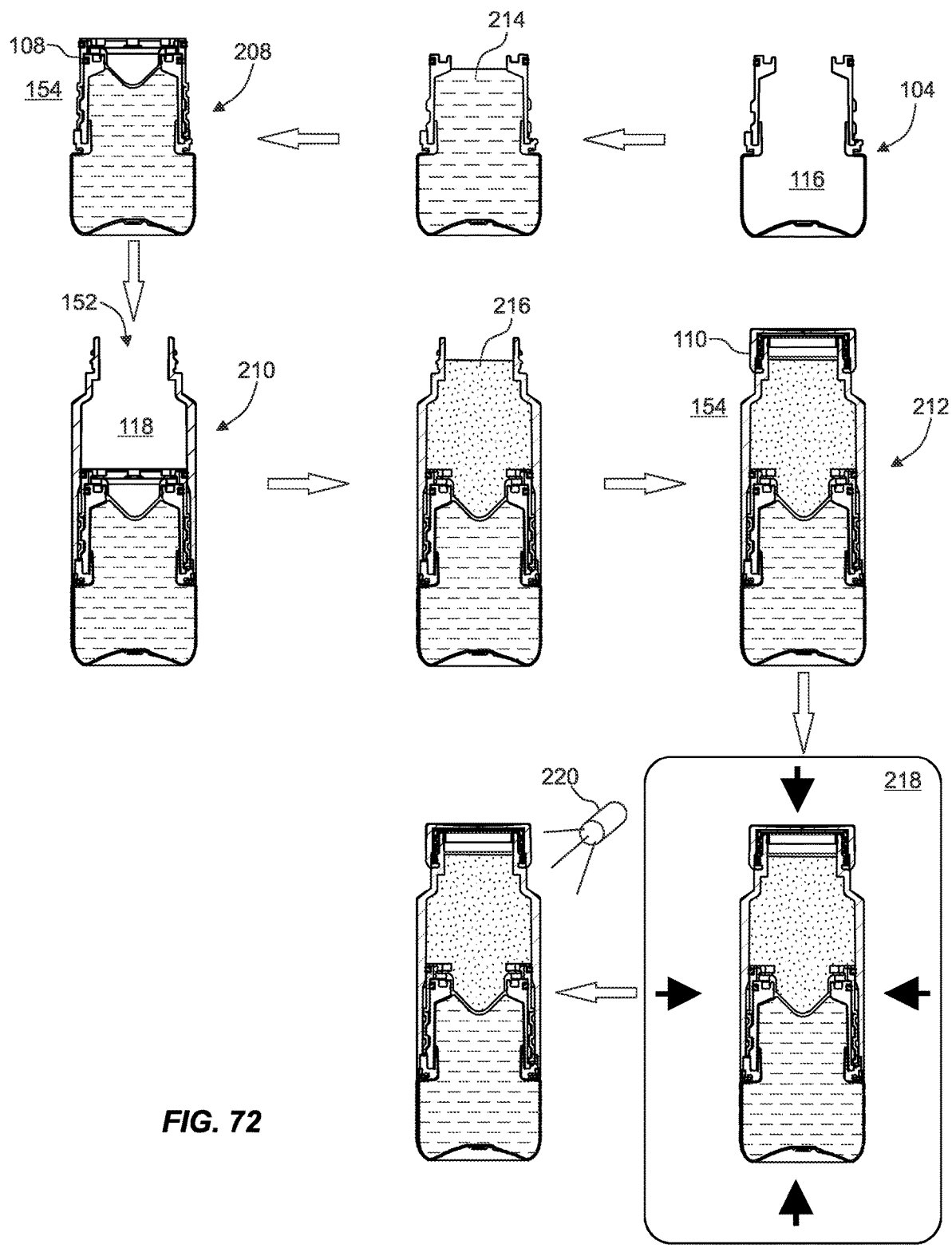
FIG. 72 is a diagrammatic chart illustrating the process in accordance with FIG. 69 as applied to one of the embodiments of a bottle system disclosed and illustrated herein.
Figure 76:
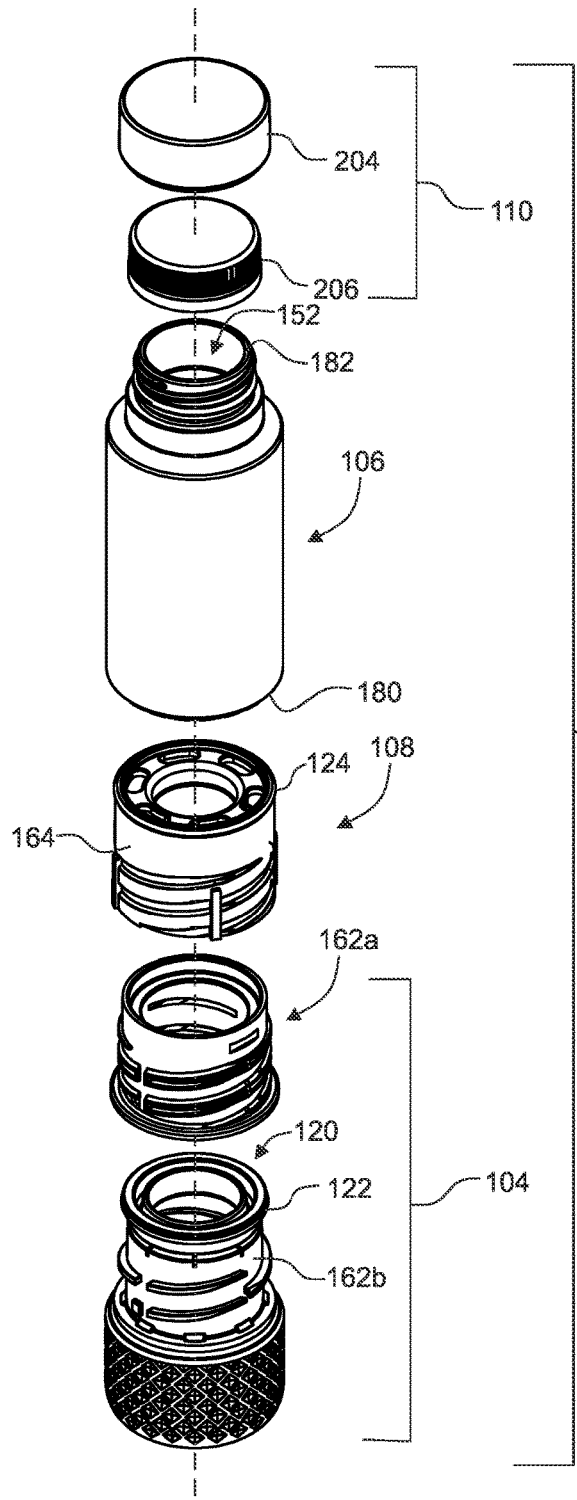
FIG. 76 is a diagrammatic exploded view of the example beverage bottle system of FIG. 73.
Figure 77:
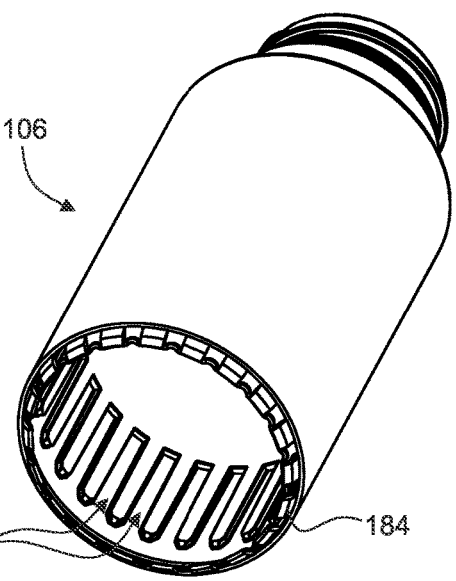
FIG. 77 is a diagrammatic side view of an example second housing element in accordance with the example beverage bottle system of FIG. 1.
Figure 78:
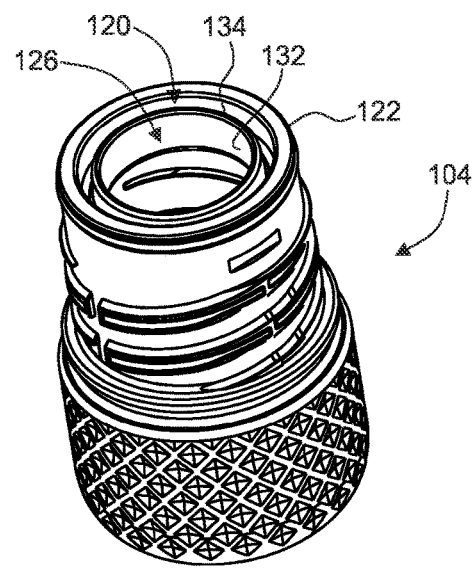
FIG. 78 is a diagrammatic perspective view of an example first housing element in accordance with the example beverage bottle system of FIG. 73.
Figure 79:
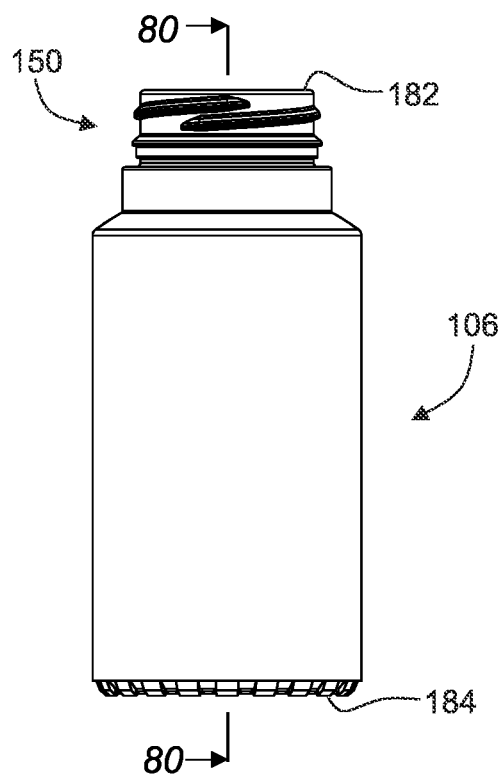
FIG. 79 is a diagrammatic side view of an example second housing element in accordance with the example beverage bottle system of FIG. 73.
Figure 80:
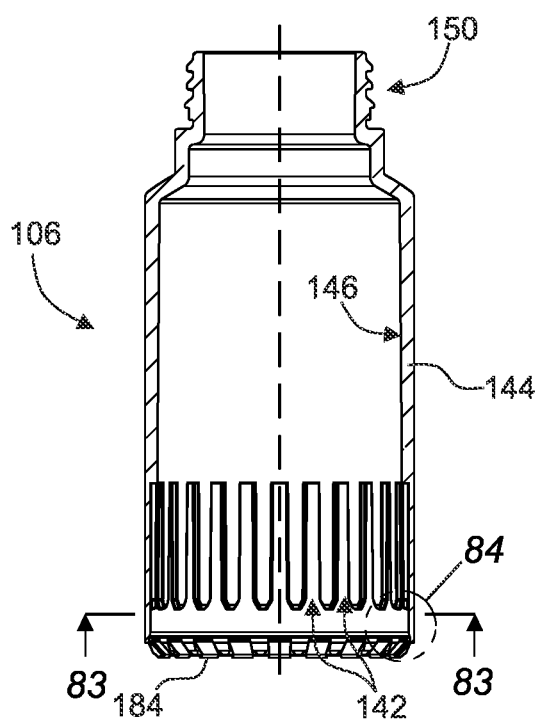
FIG. 80 is a diagrammatic cross-sectional view taken along lines 80-80 in FIG. 79.
Figure 81:
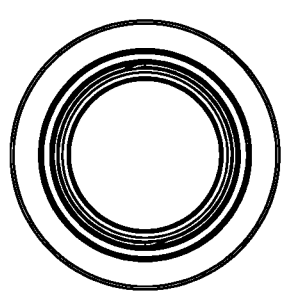
FIG. 81 is a diagrammatic top view of the second housing element of FIG. 79.
Figure 83:
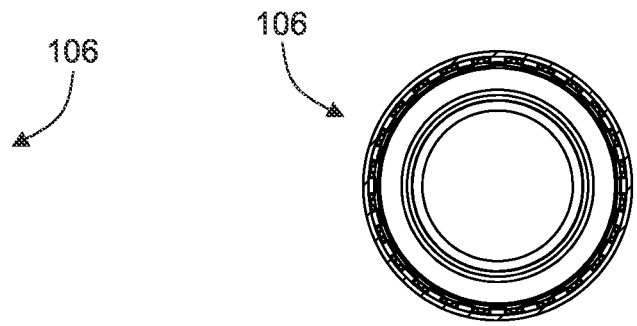
FIG. 83 is a diagrammatic cross-sectional view taken along lines 83-83 in FIG. 80.
Figure 82:
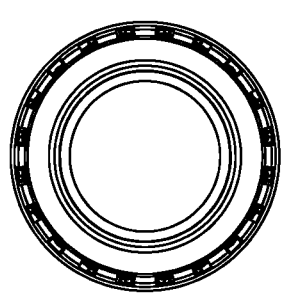
FIG. 82 is a diagrammatic bottom view of the second housing element of FIG. 79.
Figure 84:
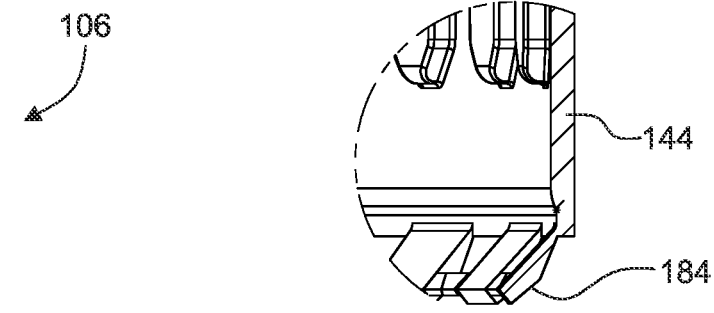
FIG. 84 is a magnified view of detail 84 of FIG. 80.
Figure 85:
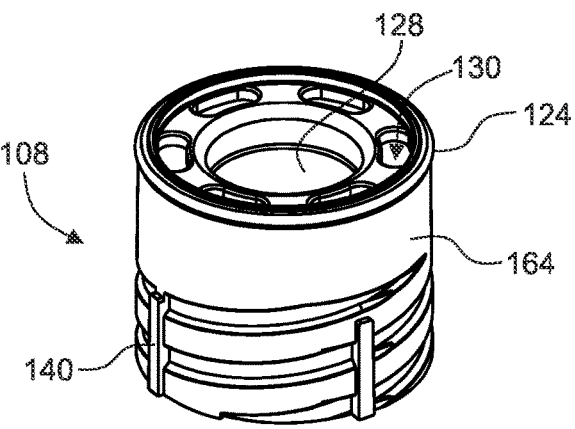
FIG. 85 is a diagrammatic perspective view of a shuttle element in accordance with the example beverage bottle system of FIG. 73.
Figure 86:
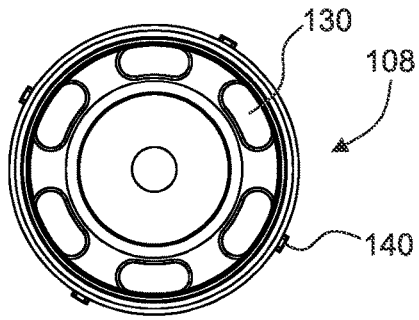
FIG. 86 is a diagrammatic top view of the shuttle element of FIG. 85.
Figure 87:
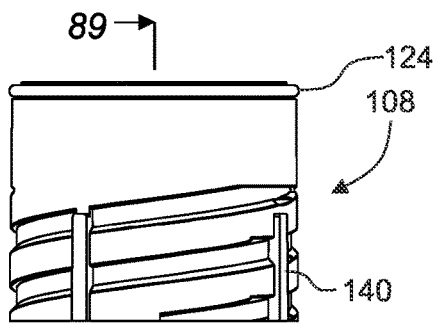
FIG. 87 is a diagrammatic side view of the shuttle element of FIG. 85.
Figure 88:
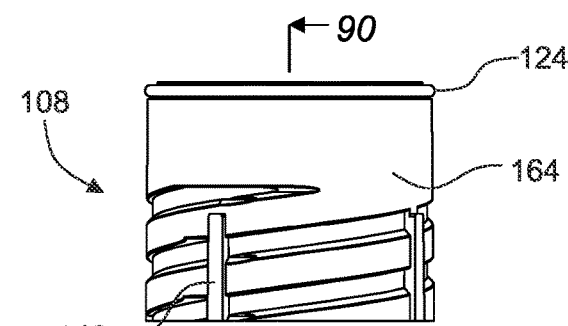
FIG. 88 is a further diagrammatic side view of the shuttle element of FIG. 85, taken at a 90-degree angle with respect to FIG. 87.
Figure 89:
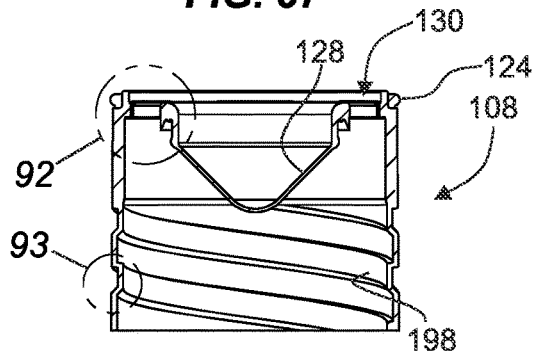
FIG. 89 is a diagrammatic cross-sectional view taken along lines 89-89 in FIG. 87.
Figure 90:
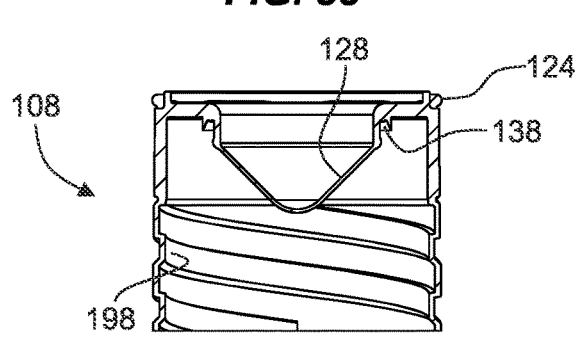
FIG. 90 is a diagrammatic cross-sectional view taken along lines 90-90 in FIG. 88.
Figure 91:
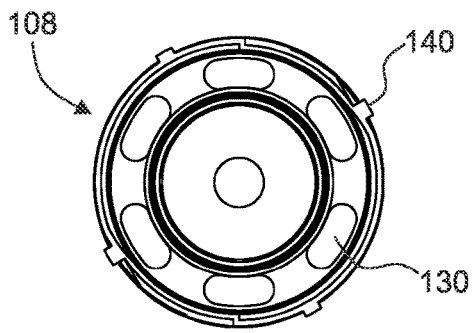
FIG. 91 is a diagrammatic bottom view of the shuttle element of FIG. 85.
Figure 92:
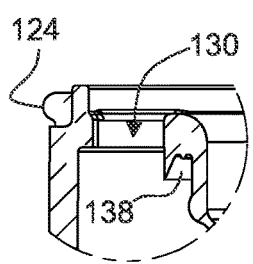
FIG. 92 is a magnified view of detail 92 of FIG. 89, illustrating the outboard annular seal having been formed in affixed engagement with the shuttle element by way of a bi-injection molding process.
Figure 93:
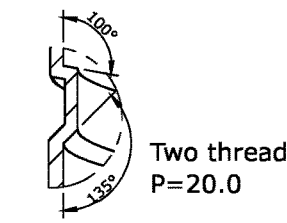
FIG. 93 is a magnified view of detail 93 of FIG. 89.
Figure 94:
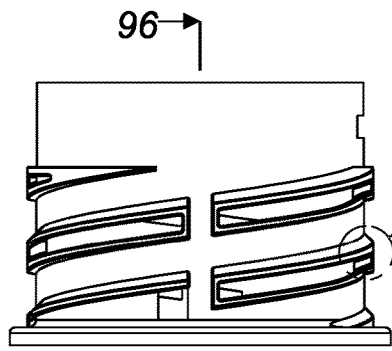
FIG. 94 is a diagrammatic side view of a radially-outer segment of a shuttle transport portion in accordance with the bottle system of FIG. 73.
Figure 97:
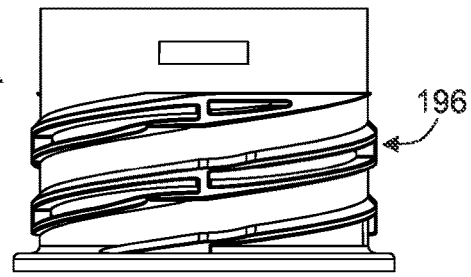
FIG. 97 is a further diagrammatic side view of the radially-outer segment of FIG. 94, taken at a 90-degree angle with respect to FIG. 94.
Figure 95:
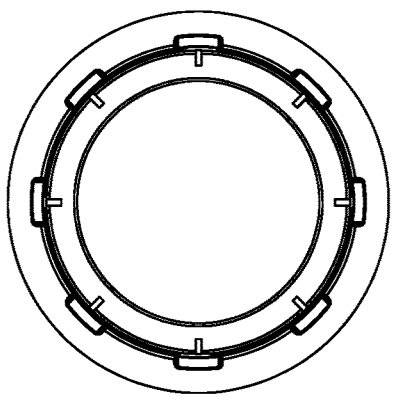
FIG. 95 is a diagrammatic bottom view of the radially-outer segment of FIG. 94.
Figure 98:
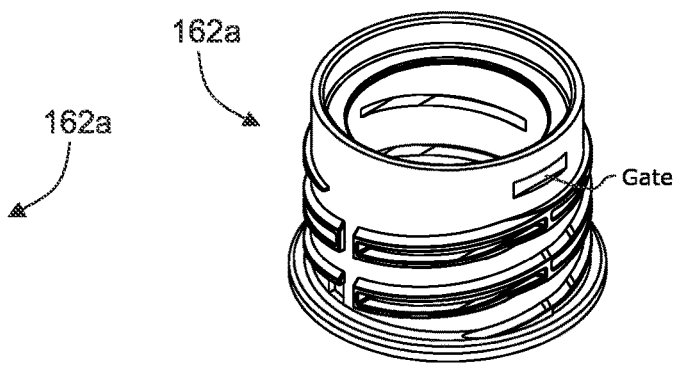
FIG. 98 is a diagrammatic perspective view of the radially-outer segment of FIG. 94.
Figure 96:
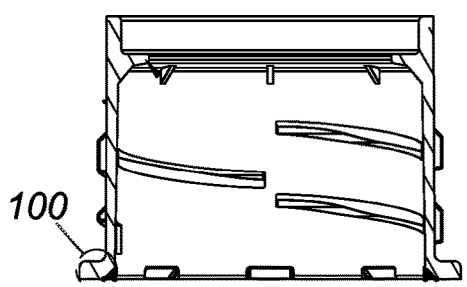
FIG. 96 is a diagrammatic cross-sectional view taken along lines 96-96 in FIG. 94.
Figure 99:
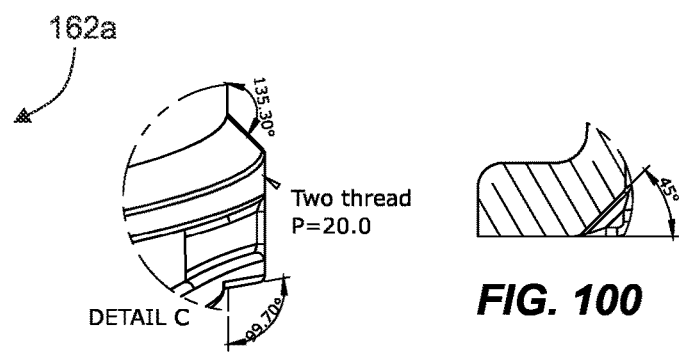
FIG. 99 is a magnified view of detail 99 of FIG. 94.
Figure 100:
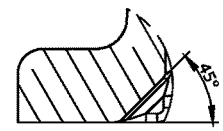
FIG. 100 is a magnified view of detail 100 of FIG. 96.
Figure 101:
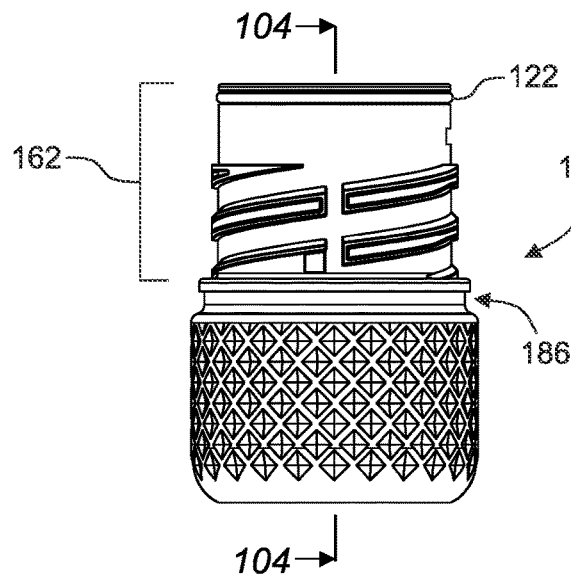
FIG. 101 is a diagrammatic side view of a first housing element of a shuttle transport portion in accordance with the bottle system of FIG. 73.
Figure 103:
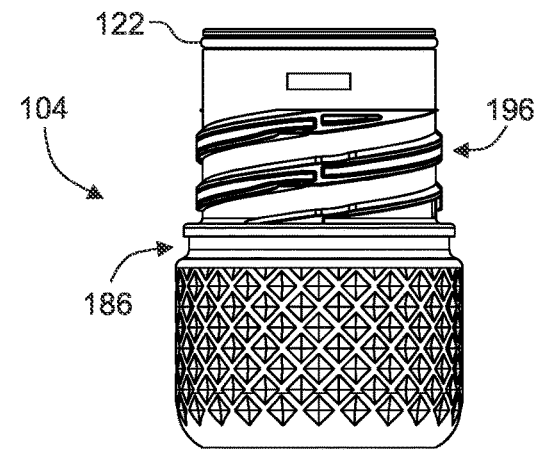
FIG. 103 is a further diagrammatic side view of the first housing element of FIG. 101, taken at a 90-degree angle with respect to FIG. 101.
Figure 102:
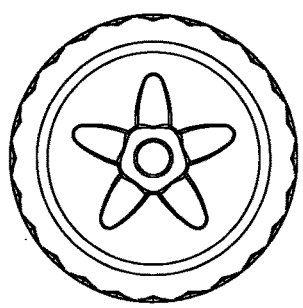
FIG. 102 is a diagrammatic bottom view of the first housing element of FIG. 101.
Figure 104:
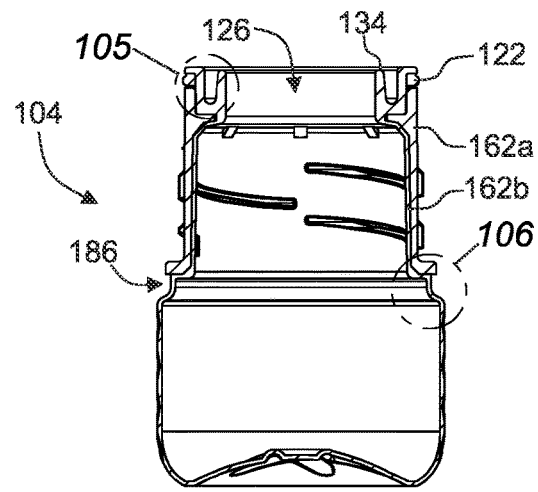
FIG. 104 is a diagrammatic cross-sectional view taken along lines 104-104 in FIG. 101, illustrating the radially-outer segment of the shuttle transport portion having been co-molded with the remainder of the first housing element.
Figure 105:
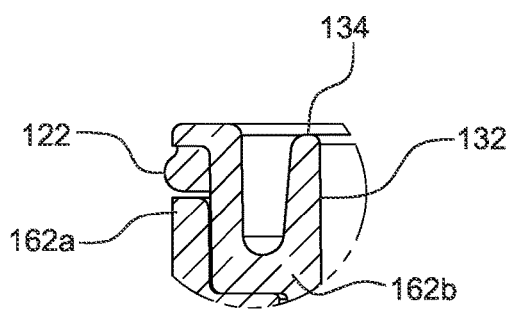
FIG. 105 is a magnified view of detail 105 of FIG. 104, illustrating the inboard annular seal having been formed in affixed engagement with the first housing element by way of a bi-injection molding process.
Figure 106:
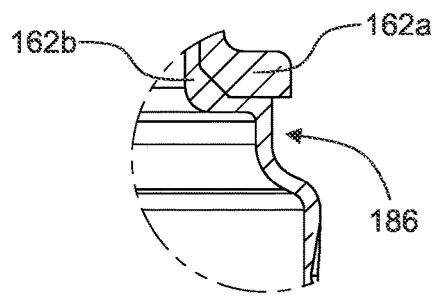
FIG. 106 is a magnified view of detail 106 of FIG. 104.

FIGS. 67-69, and respectively corresponding FIGS. 70-72, illustrate three different examples of a multi-compartment beverage bottle system fill, HPP and assembly process (which, collectively in some combination, may otherwise be referred to herein as a method for manufacturing a multi-compartment beverage bottle). In FIGS. 70-72, a first-stage subassembly is represented at 208, a second-stage subassembly is represented at 210, a third stage subassembly is represented at 212, a first fluid is represented at 214, a second fluid is represented at 216, an ambient environment is represented at 154, a high-pressure processing (HPP) chamber is represented at 218 and a drying element is represented at 220. As would be expected, the HPP chamber 218 contains a hydraulic fluid (e.g., water) within which the respective subassemblies remain submerged during HPP pressurization. Drying refers to the removal of the hydraulic fluid from the outer surfaces of the respective subassemblies following completion of the HPP.

Unless otherwise noted, the terms used herein are to be understood according to conventional usage by those of ordinary skill in the relevant art. In addition to the definitions of terms provided below, it is to be understood that as used in the specification and in the claims, "a" or "an" can mean one or more, depending upon the context in which it is used.

"Alcohol" is a term used throughout the specification and/or claims and is accordingly defined as a liquid, synthesized or obtained by fermentation of sugars and starches and widely used, either pure or denatured, as a solvent and in drugs, cleaning solutions, explosives, and intoxicating beverages.

"Adulteration" is a term used throughout the specification and/or claims and is accordingly defined as render (something) poorer in quality by adding another substance, typically an inferior one.

"Beverage" is a term used throughout the specification and/or claims and is accordingly defined as any of various liquids for drinking.

"Component" is a term used throughout the specification and/or claims and is accordingly defined as a constituent element, as of a system.

"Fasten" is a term used throughout the specification and/or claims and is accordingly defined as a means making an object difficult to remove, including heat sealing, adhesive, or various irreversible locking mechanisms.

"Fluid" is a term used throughout the specification and/or claims and is accordingly defined as a continuous, amorphous substance whose molecules move freely past one another and that has the tendency to assume the shape of its container; a liquid or gas.

"High Pressure Processing (HPP)" is a term used throughout the specification and/or claims and is accordingly defined as a method of preserving and sterilizing food, in which a product is processed under very high pressure, leading to the inactivation of certain microorganisms and enzymes in the food. HPP is a method of food processing where food is subjected to elevated pressures (up to 87,000 pounds per square inch or approximately 6,000 atmospheres), with or without the addition of heat, to achieve microbial inactivation or to alter the food attributes in order to achieve consumer-desired qualities. Pressure inactivates most vegetative bacteria at pressures above 60,000 pounds per square inch. HPP retains food quality, maintains natural freshness, and extends microbiological shelf life. The process is also known as high hydrostatic pressure processing (HHP) and ultra-high-pressure processing (UHP). It is sometimes known to one of ordinary skill within the art as pascalization or bridgmanization. Food products, in this case beverages or beverage ingredients, are sealed and placed into a steel compartment containing a liquid, often water, and pumps are used to create pressure. During HPP, the beverage's proteins are denatured, hydrogen bonds are fortified, and non-covalent bonds in the food are disrupted, while the product's main structure remains intact. HPP is not heat-based; therefore, the covalent bonds governing taste are not affected. High pressure processing causes minimal changes in the 'fresh' characteristics of foods by eliminating thermal degradation. Compared to thermal processing, HPP results in foods with fresher taste, and better appearance, texture and nutrition. High pressure processing can be conducted at ambient or refrigerated temperatures, thereby eliminating thermally induced cooked off-flavors. The technology is especially beneficial for heat-sensitive products. Most processed foods today are heat treated to kill bacteria, which often diminishes product quality. High pressure processing provides an alternative means of killing bacteria that can cause spoilage or food-borne disease without a loss of sensory quality or nutrients. In a typical HPP process, the product is packaged in a flexible container (usually a pouch or plastic bottle) and is loaded into a high pressure chamber filled with a pressure transmitting (hydraulic) fluid. The hydraulic fluid (normally water) in the chamber is pressurized with a pump, and this pressure is transmitted through the package into the food itself. Pressure is applied for a specific time, usually 3 to 5 minutes. The processed product is then removed and stored/distributed in the conventional manner. Because the pressure is transmitted uniformly (in all directions simultaneously), food retains its shape, even at extreme pressures. And because no heat is needed, the sensory characteristics of the food are retained without compromising microbial safety. The HPP process is widely used in a variety of food manufacturing contexts, including meat packing, distribution of hummus, salsas, and guacamoles, juices, soups, and other applications.

"Solution" is a term used throughout the specification and/or claims and is accordingly defined as a homogeneous, molecular mixture of two or more substances.

"Substance" is a term used throughout the specification and/or claims and is accordingly defined as a species of matter of definite chemical composition.

The systems and methods in accordance with the present disclosure generally involve a multi-compartment beverage container that discretely stores beverage ingredients, such ingredients usually being distinct, in separate chambers. When the consumer is ready to imbibe the beverage product, the consumer twists the container appropriately to cause communication between the separated compartments to allow the ingredients to mix, thereby creating a final beverage product ready for dispensing and consumption. In conjunction with the novel beverage container design, a unique method of making the container, filling it with the appropriate ingredients, and mixing of the ingredients for dispensing is disclosed.

Embodiments of a system (i.e., container) of the present disclosure may contain perishable juice or other liquids in a first compartment or chamber and an alcohol or spirit in a second compartment or chamber initially separated from the first compartment at the time of filling. The purpose of separating these beverage components or ingredients from one another is to prevent the first liquid (for example, raw juice) from being adulterated from the other substance before a consumer drinks the beverage. Such adulteration of the non-alcoholic beverage component may be caused by pasteurization or the addition of preservatives. Therefore, embodiments of the invention initially compartmentalize the ingredients, typically separating alcoholic substances from non-alcoholic substances such as juice or flavoring so that the alcohol does not degrade the quality and nutrition offered by the non-alcoholic juice or flavoring. Characteristics of the nonalcoholic beverage requiring proper protection may include flavor, color, viscosity, chemical structure, smell, freshness, and nutrition. Accordingly, mixing the components at the time of imbibing allows for the highest quality and freshness since the elapsed time of the ingredients being mixed is minimized, thereby reducing the potential for a chemical breakdown among the ingredients which would negatively affect their desired individual characteristics.

Embodiments in one or other compartments may withstand incredibly high amounts of pressure under HPP (while submerged under water or otherwise, which occurs during the HPP process). For example, an internal valve may separate the two internal chambers and be designed to withstand HPP, by way of not allowing the two separated substances to interact before the system/container is activated thereby enabling the two substances to interact.

The invention may be used as a means to distribute two distinct substances in separate compartments within the same container, which at some point would be subjected to HPP, ensuring such substances remain unadulterated during the manufacturing, distributing, and merchandising processes. The invention may also be used as a means of convenience for an end user to mix multiple substances within one container without the need to purchase or obtain such substances separately.

Finally the invention also includes a novel method of use, which includes the twisting of the bottle to mix the contents of each chamber to formulate the final beverage for consumer consumption. This process can also include the opening or unsealing of the container and the dispensing of the product.

Optionally, one or more components of the system 100 of the present disclosure may be constructed of a clear or transparent or translucent material in order to better identify/ view the liquids contained within the upper chamber and/or lower chamber. Any number of colored dyes may be used to color the external or internal pieces.

Although the first fluid compartment 116 can have less volume than the second fluid compartment 118, different ratios of liquids in each respective compartment may be used. The components of the presently-disclosed embodiments may be injection molded with a variety of different plastic resins, such as polyethylene terephthalate (pet) plastic or clarified polypropylene plastic. Any number of colored dyes may be used to color the external or internal components.

The first and second housing elements of bottles of the present disclosure may be constructed of a clear or transparent or translucent material in order to better identify/view the liquids contained within the first chamber and the second chamber. In the second fluid compartment 118, one may be able to see, for example, a colored liquid or juice, whether it be orange, purple, red, etc, while also seeing a clear, and potentially tinted yellow or orange, liquid in the first fluid compartment 116. There can be little branding and labeling on the bottle so as to accentuate the contrast between the two compartments. Additionally, the separation of the compartments may preferably be relatively in the middle of the package so that they will look equal in quantity. Lastly, the valve subsystem may also be in clear, translucent plastic, thereby causing the inner mechanics of the system/container to appear to be invisible when immersed in clear liquid in the bottom chamber, as well as making the liquid in the uppermost compartment appear to be floating without any support.

In certain embodiments, an injection molding process may be used to manufacture all of the container parts except, for example, for the first housing element 104. Bottle or dispensing caps may be blow molded. There may be one or more pieces that use alternative molding processes, such as blow molding or injection blow molding for more flexible and less rigid walls purposes of novel manufacturing, distribution or merchandising processes, including food processing application such as pasteurization or HPP. The closure element 110 (e.g., cap) may be a stock cap that can be provided by BERICAP™ or another manufacturer of closures.

Depending on the circumstance and order in a supply chain, the first fluid compartment 116 and second fluid compartment 118 may be filled, sealed, and HPP'd independently of the other. To avoid complications with drying the embodiment after HPP, the embodiment can be filled and sealed in both compartments before undergoing HPP. HPP may be used in conjunction with rigid plastics used in the construction of the beverage bottle. If sufficiently rigid plastics are used, HPP may provide no expansion of the beverage bottle body or no expansion of the contents of the beverage bottle.

Regarding one example process for filling, capping and sealing certain embodiments of the system 100 with beverage contents, the first fluid compartment 116 may be filled with any substance, and thereafter, the shuttle element 108 may be moved to its seal position, to seal the substance in the first fluid compartment 116 with the ambient environment. At this stage, without the closure element 110 affixed to the top of the second housing element 106, the second fluid compartment is open and void of substance, while the substance enclosed in the first fluid compartment 116 remains unaffected. Substance may then be inserted into the second fluid compartment 118 through the dispense aperture 152. Thereafter, the closure element 110 may be affixed to the closure securement portion 150, thereby enclosing the substance in the second fluid compartment. The embodiment would therefore be fully enclosed with two distinct substances which are thereby ready to be mixed through the activation mechanism enabling the two substances to mix.

HPP flexible plastics, thinner, less rigid construction may allow the plastic to expand (e.g., approximately 15%) as necessary to allow the pressure to adequately pass through the walls of the container to compress the juice. The second fluid compartment may have a different pressure allowance than the first fluid compartment.

Figure 41:
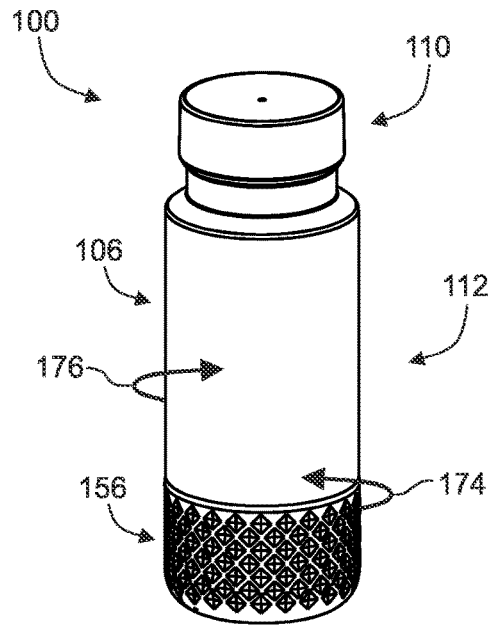
FIG. 41 is a diagrammatic perspective view of a second example multi-compartment beverage bottle system in accordance with the present disclosure.
Figure 42:
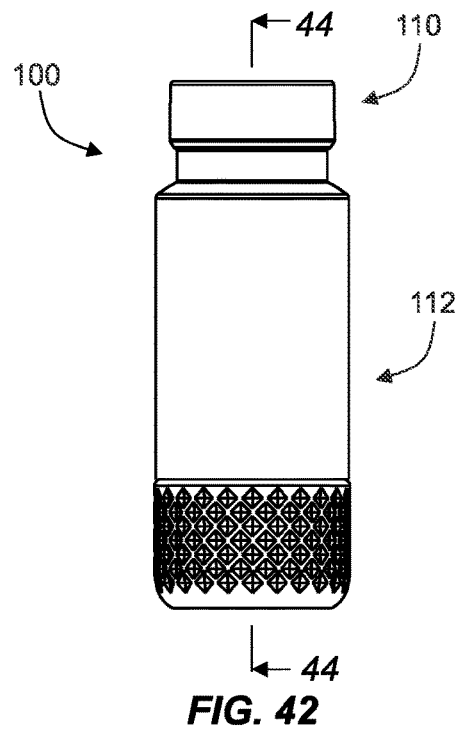
FIG. 42 is a diagrammatic side view of the example beverage bottle system of FIG. 41.

Referring to FIGS. 1 and 41, when the system 100 ("container") is ready to be used, the user can grasp the second housing element 106 with one hand, and with the other hand twist the first housing element 104 with respect to second housing element. The user simultaneously may thereby apply a valve-opening torque 174 on the first housing element 104 and a counter-torque on the second housing element 106. This rotates the first housing element 104 toward the mix position and actuates the shuttle element 108 away from the seal position, thus placing the first and second fluid compartments in fluid communication with one another (see, e.g., FIGS. 5 and 45).

In embodiments of the system 100 in which most or the entire system is be transparent, the consumer, assuming there is a difference in color between the liquids, may watch the two liquids combine and one or both liquids change color upon mixing throughout pieces. The faster a user activates the system 100 by applying the opposing torques (174 and 176), the faster the beverage component in one of the fluid compartments mixes with the other beverage component in the other fluid compartment. The more forcefully the two beverage components combine, the more mixing of the liquids occurs, and therefore more of a sensation or mixing of the liquids is created, which can be seen by the user in the transparent embodiment.

Once the beverage components fully interact, and/or if the user shakes the embodiment to ensure they fully combine, the user opens or removes the closure element 110, to pour the mixed beverage through the dispensing aperture 152.

While there have been shown and described and pointed out fundamental novel features of the present invention as applied to preferred embodiments thereof, it will be understood that various omissions and substitutions and changes in the materials, form, and details of the devices and processes illustrated, and in their operation, and in the method illustrated and described, may be made by those skilled in the art without departing from the spirit of the invention as broadly disclosed herein. All of the above-discussed patents and publications are hereby expressly incorporated by reference as if they were written directly herein. Those skilled in the art will be able to ascertain, using no more than routine experimentation, many equivalents of the specific embodiments of the invention described herein.

Moreover, the scope of the present application is not intended to be limited to the particular embodiments of the product, process, machine, manufacture, composition of matter, means, method and steps described in the specification. The present invention and its advantages have been described in detail, but it should be understood that various changes, substitutions and alternations can be made herein without departing from the spirit and scope of the invention as defined by the appended claims. Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention.

It will be understood that there are to be no limitations as to the dimensions and shape of the beverage bottle, including the storage compartment, or the materials from which the beverage bottle is manufactured. The bottles may be constructed to resemble any commercially available bottle for holding a liquid beverage and may be manufactured from any suitable plastic, glass or metal material. Furthermore, it should be understood that the bottle of the present disclosure may be adapted to store any suitable liquid, such as, for example, water, juice, milk, carbonated sodas, protein shakes, energy drinks, flavored water, beer, wine, and liquor, and not limited to only beverages or juices or alcohol. Additional manufacturing and/or bottling process steps may be incorporated, such as treating the bottle parts or bottle assembly to prevent the spread of pathogens. Specifically, the antimicrobial materials may be added to the plastic used to form the parts so that they resist growth of bacteria or viruses. Alternatively, the parts or bottle assembly may be sprayed prior to bottle shipment to sanitize the bottles via such an antibacterial treatment. Additionally, all the pieces of the present embodiment are not limited to its current bottle design or shape, but can include other modified forms which yet still achieve the same internal functionality and utility. The cylindrical shape provides users a readily understood context in that the embodiment is used as a beverage container. This shape also provides for ease of packing and distribution, grip for a user, and assembly line filling and capping.

What is claimed is:

1. A method for manufacturing a multi-compartment beverage bottle, the method comprising:
    providing a first housing element, a second housing element, a shuttle element and a closure element;
    inserting a first fluid into a first fluid compartment defined within the first housing element;
    moving the shuttle element into a seal position with respect to the first housing element, thereby forming a first stage subassembly in which the first fluid compartment is sealed from fluid communication with an ambient environment;
    subjecting the first stage subassembly to high pressure processing by way of hydraulic fluid;
    drying the first stage subassembly so as to remove hydraulic fluid therefrom;
    placing the second housing element in engagement with the first stage subassembly, thereby forming a second stage subassembly wherein
        (a) a second fluid compartment is at least partially defined by the second housing element and shuttle element, and
        (b) the first fluid compartment remains sealed from fluid communication with the second fluid compartment and ambient environment by way of the shuttle element being in its seal position;
    inserting a second fluid into the second fluid compartment by way of a dispense aperture of the second housing element; and
    sealing the second fluid compartment from fluid communication with the ambient environment by way of the closure element.

2. A method for manufacturing a multi-compartment beverage bottle, the method comprising:
    providing a first housing element, a second housing element, a shuttle element and a closure element;
    inserting a first fluid into a first fluid compartment defined within the first housing element;
    moving the shuttle element into a seal position with respect to the first housing element, thereby forming a first stage subassembly in which the first fluid compartment is sealed from fluid communication with an ambient environment;
    placing the second housing element in engagement with the first stage subassembly, thereby forming a second stage subassembly wherein
        (a) a second fluid compartment is at least partially defined by the second housing element and shuttle element, and
        (b) the first fluid compartment remains sealed from fluid communication with the second fluid compartment and ambient environment by way of the shuttle element being in its seal position;
    subjecting the second stage subassembly to high pressure processing by way of hydraulic fluid;
    drying the second stage subassembly so as to remove hydraulic fluid therefrom;
    inserting a second fluid into the second fluid compartment by way of a dispense aperture of the second housing element; and
    sealing the second fluid compartment from fluid communication with the ambient environment by way of the closure element.

3. A method for manufacturing a multi-compartment beverage bottle, the method comprising:
- providing a first housing element, a second housing element, a shuttle element and a closure element;
- inserting a first fluid into a first fluid compartment defined within the first housing element;
- moving the shuttle element into a seal position with respect to the first housing element, thereby forming a first stage subassembly in which the first fluid compartment is sealed from fluid communication with an ambient environment;
- placing the second housing element in engagement with the first stage subassembly, thereby forming a second stage subassembly wherein
  - (a) a second fluid compartment is at least partially defined by the second housing element and shuttle element, and
  - (b) the first fluid compartment remains sealed from fluid communication with the second fluid compartment and ambient environment by way of the shuttle element being in its seal position;
- inserting a second fluid into the second fluid compartment by way of a dispense aperture of the second housing element; and
- sealing the second fluid compartment from fluid communication with the ambient environment by way of the closure element, thereby forming a third stage subassembly including the first housing element, second housing element, shuttle element, closure element, first fluid and second fluid;
- subjecting the third stage subassembly to high pressure processing by way of hydraulic fluid; and
- drying the third stage subassembly so as to remove hydraulic fluid therefrom.

4. A method for manufacturing a multi-compartment beverage bottle, the method comprising:
- providing a first housing element, a second housing element, a shuttle element and a closure element, the first housing element including a shuttle transport portion;
- affixing an inboard annular seal to the shuttle transport portion by way of a bi-injection process mutually involving the inboard annual seal and the first housing element;
- inserting a first fluid into a first fluid compartment defined within the first housing element;
- moving the shuttle element into a seal position with respect to the first housing element, thereby forming a first stage subassembly in which the first fluid compartment is sealed from fluid communication with an ambient environment;
- placing the second housing element in engagement with the first stage subassembly, thereby forming a second stage subassembly wherein
  - (a) a second fluid compartment is at least partially defined by the second housing element and shuttle element, and
  - (b) the first fluid compartment remains sealed from fluid communication with the second fluid compartment and ambient environment by way of the shuttle element being in its seal position;
- inserting a second fluid into the second fluid compartment by way of a dispense aperture of the second housing element; and
- sealing the second fluid compartment from fluid communication with the ambient environment by way of the closure element.

5. A method as defined in claim 4, wherein
- (a) the inboard annular seal is comprised of a thermoplastic elastomer; and
- (b) the shuttle transport portion is comprised of a polypropylene.

6. A method for manufacturing a multi-compartment beverage bottle, the method comprising:
- providing a first housing element, a second housing element, a shuttle element and a closure element;
- inserting a first fluid into a first fluid compartment defined within the first housing element;
- affixing an outboard annular seal to the shuttle element by way of a bi-injection molding process mutually involving the outboard annual seal and the shuttle element;
- moving the shuttle element into a seal position with respect to the first housing element, thereby forming a first stage subassembly in which the first fluid compartment is sealed from fluid communication with an ambient environment;
- placing the second housing element in engagement with the first stage subassembly, thereby forming a second stage subassembly wherein
  - (a) a second fluid compartment is at least partially defined by the second housing element and shuttle element, and
  - (b) the first fluid compartment remains sealed from fluid communication with the second fluid compartment and ambient environment by way of the shuttle element being in its seal position;
- inserting a second fluid into the second fluid compartment by way of a dispense aperture of the second housing element; and
- sealing the second fluid compartment from fluid communication with the ambient environment by way of the closure element.

7. A method as defined in claim 6, wherein
- (a) the outboard annular seal is comprised of a thermoplastic elastomer; and
- (b) the shuttle element is comprised of a polypropylene.

* * * * *